(12) United States Patent
Oyama et al.

(10) Patent No.: US 6,286,956 B1
(45) Date of Patent: Sep. 11, 2001

(54) MULTIFOCAL OCULAR LENS INCLUDING INTERMEDIATE VISION CORRECTION REGION BETWEEN NEAR AND DISTANT VISION CORRECTION REGIONS

(75) Inventors: Hiroyuki Oyama, Kakamigahara; Tadashi Sawano; Kazuya Miyamura, both of Aichi-ken; Asaki Suzaki, Kasugai; Yukihisa Sakai, Aichi-ken, all of (JP)

(73) Assignee: Mencion Co., Ltd., Nagoya (JP)

( * ) Notice: Subject to any disclaimer, the term of this patent is extended or adjusted under 35 U.S.C. 154(b) by 0 days.

(21) Appl. No.: 09/419,696

(22) Filed: Oct. 14, 1999

(30) Foreign Application Priority Data

Oct. 19, 1998 (JP) .................................... 10-296786
Oct. 19, 1998 (JP) .................................... 10-296787

(51) Int. Cl.$^7$ ..................................................... G02C 7/04
(52) U.S. Cl. ............................................. 351/161; 351/177
(58) Field of Search ........................... 351/160 R, 160 H, 351/161, 162, 177

(56) References Cited

U.S. PATENT DOCUMENTS

| | | | |
|---|---|---|---|
| 4,580,882 | 4/1986 | Nuchman et al. | 351/161 |
| 5,422,687 | * 6/1995 | Tanaka et al. | 351/161 |
| 5,532,768 | * 7/1996 | Onogi et al. | 351/161 |
| 5,619,289 | 4/1997 | Seidner et al. | 351/161 |

FOREIGN PATENT DOCUMENTS

| | | |
|---|---|---|
| 0 756 189 A2 | 1/1997 | (EP) . |
| 0 942 312 A2 | 9/1999 | (EP) . |
| 63-95415 | 4/1988 | (JP) . |
| 1-319729 | 12/1989 | (JP) . |
| 2-217818 | 8/1990 | (JP) . |
| 5-181096 | 7/1993 | (JP) . |
| 9-26559 | 1/1997 | (JP) . |
| 88/09950 | 12/1988 | (WO) . |

* cited by examiner

Primary Examiner—Scott J. Sugarman
(74) Attorney, Agent, or Firm—Burr & Brown

(57) ABSTRACT

Multifocal ocular lens including a central vision correction region having a first optical power value, an outer vision correction region spaced radially outwardly from the central vision correction region and having a second optical power value different from the first optical power value, and an intermediate vision correction region located radially intermediate between the central and outer vision correction regions and having a distribution of optical power between the first and second optical power values, and wherein the intermediate region has a first transition point and a second transition point which is not radially inwardly spaced from the first transition point, such that the distribution of the optical power of the intermediate region includes two optical power values which are defined by the first and second transition points, respectively, and which are determined such that the optical power value defined by the second transition point is closer to the first optical power value of the central region than the optical power value defined by the first transition point.

33 Claims, 14 Drawing Sheets

MULTIFOCAL OCULAR LENS INCLUDING INTERMEDIATE VISION CORRECTION REGION BETWEEN NEAR AND DISTANT VISION CORRECTION REGIONS

This application is based on Japanese Patent Application Nos. 10-296786 and 10-296787 both filed on Oct. 19, 1998, the contents of which are incorporated hereinto by reference.

BACKGROUND OF THE INVENTION

1. Field of the Invention

The present invention relates in general to an ocular lens such as a contact lens placed on an eyeball or an intraocular lens inserted within an eye. More particularly, the present invention is concerned with a multifocal ocular lens having a plurality of vision correction regions having respective different values of optical or vision correction power.

2. Discussion of the Related Art

As an ocular lens used for vision correction of an eye suffering from deteriorated accommodation such as presbyopia, there has been proposed a multifocal ocular lens having a plurality of vision correction regions which have respective different values of optical power. As one example of the multifocal ocular lens, JP-A-63-95415 and JP-A-1-319729 disclose an alternating or translating vision type contact lens, wherein the vision correction regions with different values of optical power are selectively and alternatively used as need in observing objects, with a shift of the visual axis of the lens user or wearer. As another example of the multifocal ocular lens, U.S. Pat. No. 4,580,882 and JP-A-2-217818 disclose a simultaneous vision type contact lens, wherein the vision correction regions are simultaneously used, and one of the vision correction regions through which a desired image is observed is selected by an action of the lens wearer's brain.

In either of the alternating and simultaneous vision type ocular lenses described above, there is proposed: a so-called bifocal ocular lens having two vision correction regions, i.e., a near vision correction region through which near objects are observed, and a distant or far vision correction region through which distant objects are observed; and a multifocal ocular lens having such near and distant vision correction regions and at least one intermediate vision correction region which is interposed between those near and distant vision correction regions and which has an optical power value different from the optical power values of the near and distant vision correction regions. The multifocal ocular lens has at least three vision correction regions having respective different optical power values.

The bifocal ocular lens having the two vision correction regions, i.e., the near and distant vision correction regions, tends to suffer from a jump or overlapping of the image of an object which is located intermediate between the near and distant objects. This is because the bifocal ocular lens has only two focal points which correspond to the respective near and distant vision correction regions. Further, the bifocal ocular lens has surface discontinuity at a junction of the near and distant vision correction regions. In other words, the two vision correction regions are not smoothly connected to each other at the junction therebetween, with a result of deteriorating a wearing comfort as felt by the lens user.

In the multifocal ocular lens, each of the plurality of vision correction regions inevitably has a relatively small radial dimension, so that the optical power of the lens changes in steps in its radial direction, corresponding to the three or more vision correction regions. In this case, the near and distant vision correction regions do not have sufficiently large surface areas, whereby the images to be viewed through these near and distant vision correction regions undesirably tend to be blurred. Moreover, since the optical power in the at least one intermediate vision correction region changes in steps, the multifocal ocular lens does not assure a high degree of visual acuity of the object located intermediate between the near and distant objects, so that the multifocal ocular lens is likely to suffer from a problem of ghosting or double imaging.

JP-A-5-181096 discloses a multifocal ocular lens having a near vision correction region, an intermediate vision correction region, and a distant vision correction region, so that the optical power of the multifocal ocular lens continuously varies in its radial direction from the value of one of the near and distant vision correction regions to the value of the other of the near and distant vision correction regions. This multifocal ocular lens was developed in an attempt to improve its wearing comfort as felt by the lens user, and assure clear view of the objects located intermediate between the near and distant objects. However, the proposed multifocal ocular lens is still unsatisfactory in providing sufficiently clear viewing of both of the near and distant objects.

JP-A-9-26559 proposes a bifocal ocular lens having a plurality of pairs of near and distant vision correction regions which are arranged such that the near and distant vision correction regions are alternately located in the radial direction of the ocular lens. Like the ordinary bifocal lens having one pair of near and distant vision correction regions, the proposed bifocal ocular lens does not assure clear view of the objects located intermediate between the near and distant objects, and suffers from the jump or overlapping of the image.

SUMMARY OF THE INVENTION

It is therefore an object of the present invention to provide a multifocal ocular lens which is capable of assuring sufficiently enhanced visual acuity of an object located intermediate between near and distant objects with high stability, while at the same time assuring a high degree of visual acuity of both the near and distant objects.

The above object may be achieved according to a principle of the present invention which provides a multifocal ocular lens having a vision correction area which has different values of optical power and comprises: a central vision correction region having a first optical power value; an outer vision correction region located radially outwardly of the central vision correction region with a predetermined radial spacing therebetween and having a second optical power value different from the first optical power value; and an intermediate vision correction region located radially intermediate between the central and outer vision correction regions and having a distribution of optical power between the first and second optical power values, and wherein the intermediate vision correction region has at least one pair of a first transition point and a second transition point which is not radially inwardly spaced from the first transition point, the distribution of optical power of the intermediate vision correction region including two optical power values which are defined by the first and second transition points, respectively, and which are determined such that the optical power value defined by the second transition point is closer to the first optical power value of the central vision correction region than the optical power value defined by the first transition point.

In the multifocal ocular lens constructed according to the first aspect of this invention described above, the central and outer vision correction regions may be formed to have the respective constant first and second optical power values which are different from each other and which are tuned to assure high degrees of visual acuity of objects at the respective desired near and distant distances or vice versa.

In the intermediate vision correction region located between the central and outer vision correction regions, the optical power value defined by the second transition point which is radially spaced from or aligned with the first transition point is closer to the first optical power value of the central vision correction region than the optical power value defined by the first transition point. Namely, the two different optical power values at the first and second transition points in the intermediate vision correction region are determined such that the optical power value at the first transition point is closer to the second optical value of the outer vision correction region while the optical power value at the second transition point is closer to the first optical value of the central vision correction region, so that the optical power of the intermediate vision correction region does not simply increases or decreases in one direction between the first and second optical power values of the central and outer vision correction regions. For instance, the optical power value in the intermediate region varies in the radial direction of the vision correction region such that the optical power value first increases from the first optical value of the central vision correction region to the optical power value at the radially inner first transition point, then decreases to the optical power value at the radially outer second transition point, and finally again increases from the optical power value at the second transition point to the second optical power value of the outer vision correction region. The radial distribution of the third optical power value of the intermediate vision correction region which includes the optical power values defined by the first and second transition points as described above permits high degrees of visual acuity of objects at the desired particular intermediate distances to which the optical values at the first and second transition points are tuned.

The present ocular lens is applicable to various types of ocular lens such as contact lenses and intraocular lenses, in particular, to the contact lens of hard or soft type, which may be a presbyopia correction contact lens.

According to one preferred form of the invention, the central vision correction region is used as a distant vision correction region having the first optical power value Pa (Dptr.), while the outer vision correction region is used as a near vision correction region having the second optical power value Pd (Dptr.), and the optical power value Pb (Dptr.) defined by the first transition point and the optical power value Pc (Dptr.) defined by the second transition point are determined so as to satisfy the following formulas:

$Pa+(Pd-Pa)2/3 \leq Pb \leq Pd$ $Pa+0.25 \leq Pc \leq Pa+(Pd-Pa)/3.$

In the above preferred form of the invention, the central distant vision correction region and the outer near vision correction region may be formed to have the respective substantially constant first and second optical power values suitable for the distant and near vision corrections for high degrees of visual acuity of objects at desired far and near distances. However, the first and second optical values may slightly vary in the radial direction in the respective central and outer vision correction regions, for reducing the aberration.

Further, the optical power value defined by the first transition point is closer to the second optical value of the outer near vision correction region, while the optical power value defined by the second transition point is closer to the first optical value of the central distant vision correction region. The present arrangement assures improved stability in the visual acuity of the distant and near objects even where the optical center axis of the ocular lens is displaced from the center of the pupil of the lens wearer, and permits improved visual acuity of objects at particular intermediate distances corresponding to the optical values at the first and second transition points.

In the present preferred form of the invention wherein the optical power values Pb, Pc defined by the respective first and second transition points in the intermediate vision correction region are determined so as to satisfy the above-indicated formulas, the optical power value Pb defined by the first transition point may be made equal to the second optical power value of the outer near vision correction region, so as to improve the visual acuity of the near objects, even where the central and outer vision correction regions are formed so as to give priority to the distant vision correction. Where a relatively higher degree of visual acuity is assured for the near objects, or where it is desired to improve the visual acuity of the intermediate objects, it is preferable to determine the optical power value Pb at the first transition point, so as to satisfy the following formula:

$Pa+(Pd-Pa)2/3 \leq Pb \leq Pd-0.25.$

BRIEF DESCRIPTION OF THE DRAWINGS

The above and optional objects, features, advantages and technical industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
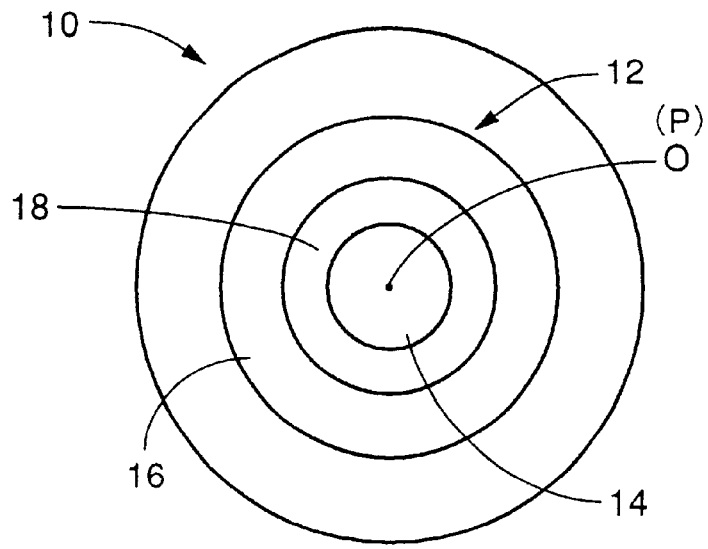
FIG. 1 is a plan view showing a multifocal ocular lens in the form of a contact lens constructed according to one embodiment of this invention.

Referring first to FIG. 1, there is shown a multifocal ocular lens in the form of a contact lens 10 constructed according to one embodiment of this invention. This contact lens 10 includes, in a substantially central portion thereof, a vision correction area 12 having a vision correction or optical power (diopter) for correcting the lens user's vision. In the contact lens 10 of FIG. 1, the vision correction area 12 has an optical center axis P aligned with a geometric center axis O of the lens 10, which is a center of a circle defined by the circumferential periphery of the lens 10. The optical center axis P may be suitably offset from the geometric center axis O, in a suitable radial direction and by a suitable radial distance, depending upon the position of the pupil and the shape of the cornea of the lens user, as shown in FIG. 2 by way of example.

In view of general tendencies regarding the configuration and curvature of the cornea and the position of the pupil, it is preferable that the optical center axis P of the vision correction area 12 be offset from the geometric center axis O of the lens 10 by a distance of not larger than 2.0 mm, a radial direction toward a side portion of the contact lens 10, which side portion is to be located on the side of the nose of the lens user when the contact lens is worn on the user's eye. When the contact lens whose optical center axis P is offset from the geometric center axis O as described above is worn on the lens user's eye, the optical center axis P is easily aligned with the center of the pupil, so that the contact lens effectively achieves an enhanced vision correction performance. The optical center axis P of the vision correction area 12 of the contact lens 10 may be offset from the geometric center axis O of the contact lens in the downward direction as also shown in FIG. 2 or in the upward direction, depending upon the living environment or lifestyle of the lens user. When the contact lens whose optical center axis P is offset from its geometric center axis O in this manner is worn on the lens user's eye, the optical center axis P can be easily aligned with the center of the pupil. Further, the optical center axis P may be offset from the geometric center axis O only in the vertical direction, for example, in the downward direction, without offsetting in the horizontal direction, when the contact lens 10 is worn on the user's eye.

An annular area located radially outwardly of the vision correction area 12, that is, the radially outermost annular portion of the contact lens 10 is not to be located on the pupil of the lens user's eye when the contact lens 10 is worn on the eye. Accordingly, this radially outermost annular portion does not have any optical vision correction power or effect, and is provided for easier and more stable fitting and positioning of the lens on the eye. This radially outermost portion may be subjected to a slab-off machining as needed. Especially when the optical center axis P is offset from the geometric center axis O of the contact lens 10 depending upon the position of the pupil of the lens user's eye, as described above, the contact lens 10 is provided with a suitable rotation preventive mechanism for preventing rotational displacement of the lens in its circumferential direction during its use on the eye. As this rotation preventive mechanism, a prism ballast mechanism is preferably provided. The contact lens which employs the prism ballast mechanism has a gravity center at a relatively lower portion thereof, with the wall thickness of the lower portion being increased, so that the contact lens 10 can be placed on the eye while maintaining the desired circumferential orientation. Since the prism ballast mechanism is known in the art, a detailed description thereof is dispensed with.

Figure 2:
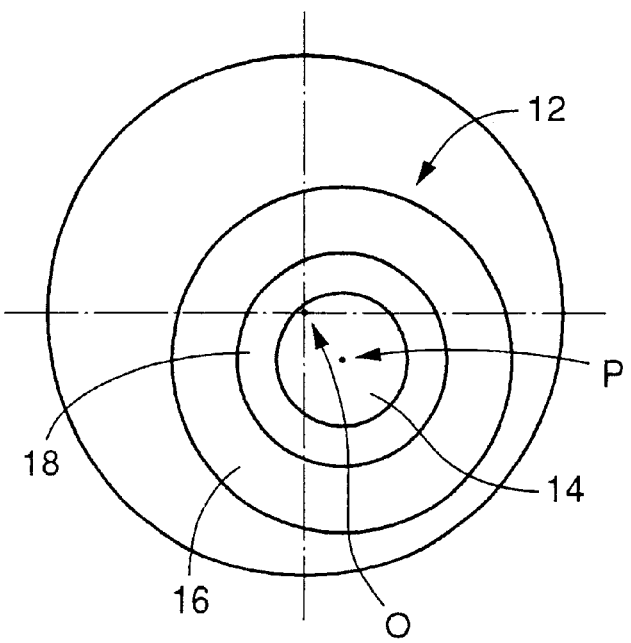
FIG. 2 is a plan view showing a contact lens constructed according to another embodiment of the invention.
Figure 3:
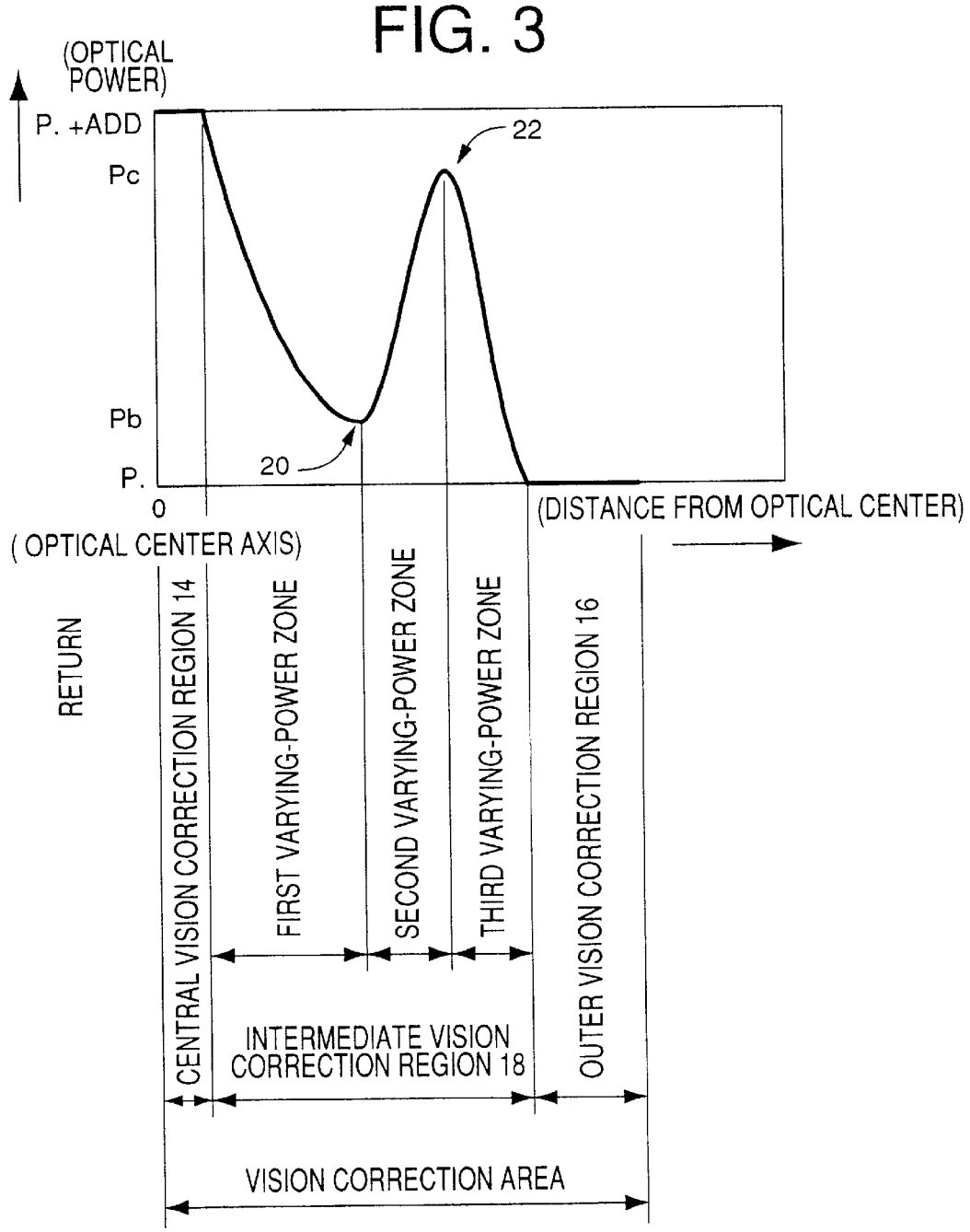
FIG. 3 is a graph showing an example of a distribution of an optical power of a contact lens according to the invention.

As shown in FIGS. 1 and 2, the vision correction region 12 of the present contact lens 10 includes a central vision correction region 14, a radially outer vision correction region 16, and an intermediate region 18 which is located between the central vision correction region 14 and the outer vision correction region 16. These three regions 14, 16, 18 have different optical power values. For the contact lens 10 to function as a simultaneous vision type multifocal contact lens, it is preferable that the three vision correction regions 14, 16, 18 be formed concentrically with each other, having a common optical center axis lying on the optical center axis P.

In the contact lens 10 of FIGS. 1 and 2, the central vision correction region 14 has a circular shape having a center located on the optical center axis P, and the radially outer vision correction region 16 has an annular shape concentric with the central vision correction region 14, and is radially outwardly spaced from the central vision correction region 14. The intermediate vision correction region 18 also has an annular shape concentric with the central and outer vision correction regions 14, 16 and is located radially intermediate between the central and outer vision correction regions 14, 16. It is noted that the vision correction regions 14, 16, 18 need not have a truly circular or annular shape, but may be formed to have an elliptical shape or an elliptically annular shape.

The central and outer vision correction regions 14, 16 having the respective different values of optical power serve as one and the other of a near vision correction region and a distant vision correction region. The near vision correction region provides a constant vision correction optical power value for correcting the user's near vision over a selected portion or preferably an entire portion of its radial width or dimension. On the other hand, the distant vision correction region provides a constant vision correction optical power value for correcting the user's distant vision over a selected portion or preferably an entire portion of its radial width or dimension. Depending upon the user's visual requirements and lifestyle or living environment, for example, the central and outer vision correction regions 14, 16 are used as one and the other of the near and distant vision correction regions, respectively.

It is preferable that the inner surface (i.e., the spherical concave surface) of the contact lens 10 be formed as a base curved surface having a profile following that of the cornea of the lens user's eye. In general, the vision correction regions 14, 16, 18 of the contact lens 10 are given the respective different optical power values, by adjusting the configuration of its outer surface (i.e., the spherical convex surface). Alternatively, the optical power values of the vision correction regions 14, 16, 18 can be tuned to the respective desired values, by adjusting the configurations of both of its inner and outer surfaces, or by adjusting the configuration of the inner surface only.

Generally, the contact lens 10 has the opposite inner and outer surfaces formed to have spherical shapes corresponding to the central and outer vision correction regions 14, 16, so that the optical power values of these two regions 14, 16 are constant over their entire areas. When it is required to correct the vision of the eye suffering from astigmatism, at least one of the inner and outer surfaces of the vision correction area 12 of the contact lens has a toric portion, so that the vision correction area 12 has different values of optical power in different diametric directions.

The intermediate vision correction region 18 has a distribution of optical power which is intermediate between the constant optical power values of the central and outer vision correction regions 14, 16, and is not constant over its entire area but varies in the radial direction. The optical power of the intermediate vision correction region 18 may have a suitable distribution in the radial direction, as shown in the graphs of FIGS. 3–13 by way of example. Each of the different distribution patterns of the optical power of the intermediate vision correction region 18 shown in FIGS. 3–13 has at least one first transition point 20 and at least one second transition point 22 at which the region 18 has different optical power values. The optical power value defined by the second transition point 22 is closer to the constant optical power value of the central vision correction region 14, while the optical power value defined by the first transition point 20 is closer to the constant optical power value of the outer vision correction region 16. In the embodiments of FIGS. 3–13, the second transition point 22 is located radially outwardly of the first transition point 20, or radially aligned with the first transition point 20. Namely, the second transition point 22 is not radially inwardly spaced from the first transition point 20.

In the graphs of FIGS. 3–13, the optical power distribution of the vision correction area 12 in the radial direction (from the optical center axis P to the outer periphery of the outer vision correction region 16) is represented in a rectangular coordinate system wherein the radial distance from the optical center axis P (radial position of the vision correction area 12) is taken along the abscissa (horizontal axis) while the optical power value of the vision correction area 12 is taken along the ordinate (vertical axis). In the graphs, the optical power value of the distant vision correction region 14 or 16 is represented by P., while the optical power value of the near vision correction region 14 or 16 is represented by P.+ADD, where "ADD" represents an additional value by which the optical power value of the near vision correction region is higher than the optical power value P. of the distant vision correction region.

In the distribution patterns of FIGS. 3–7, 9 and 11–13, the intermediate vision correction region 18 includes one pair of first and second transition points 20, 22, that is, one first transition point 20 and one second transition point 22. In the distribution pattern of FIG. 10, however, the intermediate vision correction region 18 includes two pairs of first and second transition points 20, 22, that is, two first transition points 20 and two second transition points 22, which are alternately located in the radial direction. However, three or more pairs of first and second transition points 20, 22 may be provided in the intermediate vision correction region 18. In the distribution pattern of FIG. 8, the intermediate vision correction region 18 includes two adjacent first transition points 20. The visual acuity of objects to be viewed through the intermediate vision correction region 18 may be adjusted by suitably selecting the number of pairs of the first and second transition points 20, 22, or by suitably determining the optical power at the first and second transition points 20, 22 at different values so that the object at a particular intermediate distance or the objects at particular two or more intermediate distances can viewed with a comparatively high degree of acuity.

In each of the distribution patterns of FIGS. 3–5, 7, 8 and 10–13, the optical power distribution in the intermediate vision correction region 18 in the radial direction is represented by a single line which is continuous over the entire radial dimension of the intermediate vision correction region 18. The first and second transition points 20, 22, which lie on this distribution line, are extreme values, namely, maximal and minimal values at which the direction of change of the optical power changes (e.g., from a decrease to an increase). For instance, the optical power distribution in a given radial zone of the intermediate vision correction region 18 continuously varies as a function of the radial position or distance, or is represented by a functional equation including the radial distance as a variable. In a differentiable range of the radial position, the maximal and minimal points are points at which the differential coefficient is zero. In a range of the radial position wherein a differential coefficient is not present, the extreme value is a point to which the optical power value increases or decreases. In the distribution pattern of FIG. 6 wherein the first and second transition points 20, 22 are radially aligned with each other, the optical power continuously decreases in the radially outward direction in each of a first and a second radial zone of the intermediate vision correction region 18. Two lines representing the distributions in these first and second radial zones are not connected at their ends to each other. The first transition point 20 is the smallest value of the optical power at the radially outer end of the radially inner first zone, while the second transition point 22 is the largest value of the optical power at the radially outer end of the radially outer second zone. These smallest and largest values are also considered to be extreme values.

Figure 8:
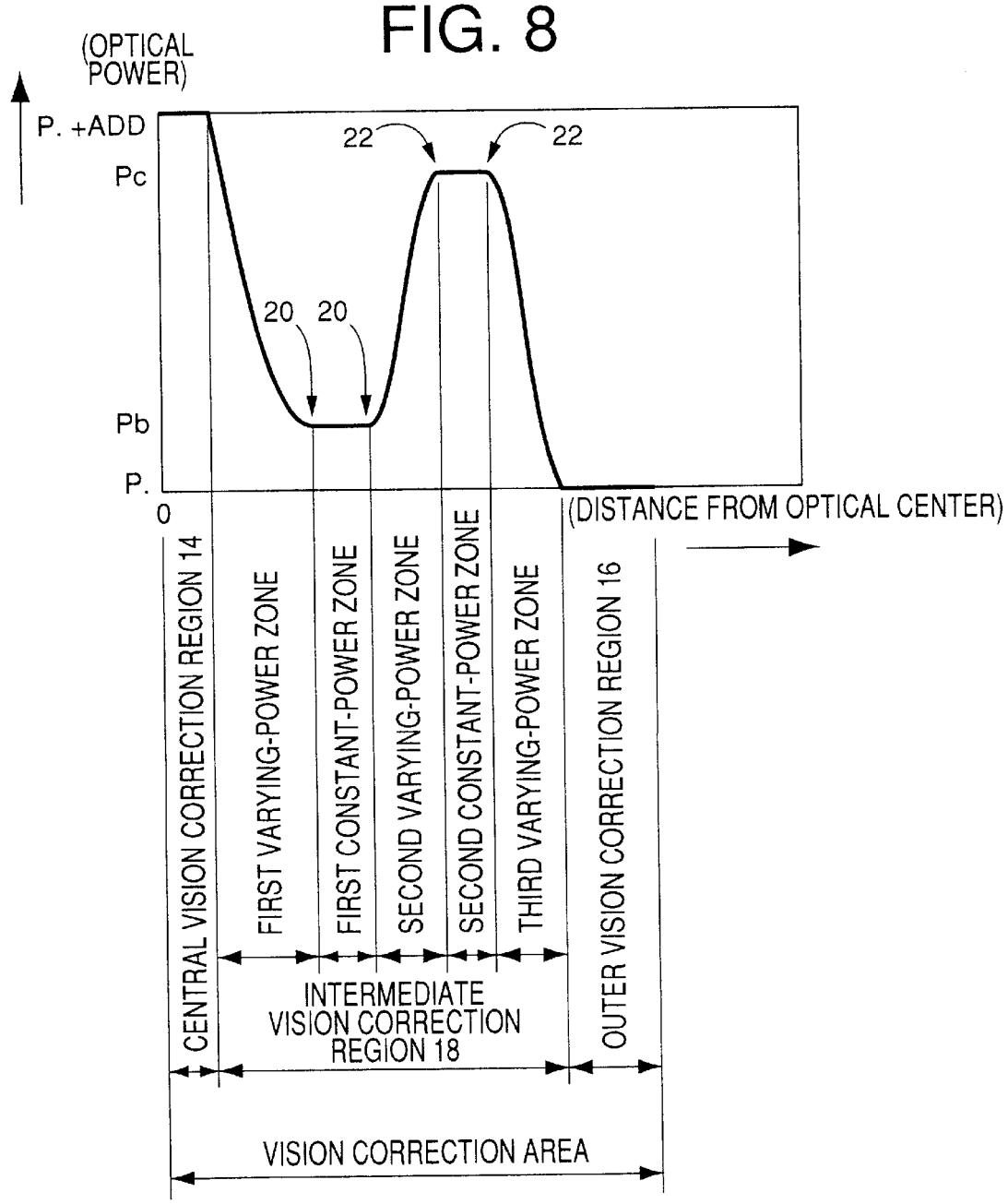
FIG. 8 is a graph showing still another example of the optical power distribution of the contact lens.
Figure 9:
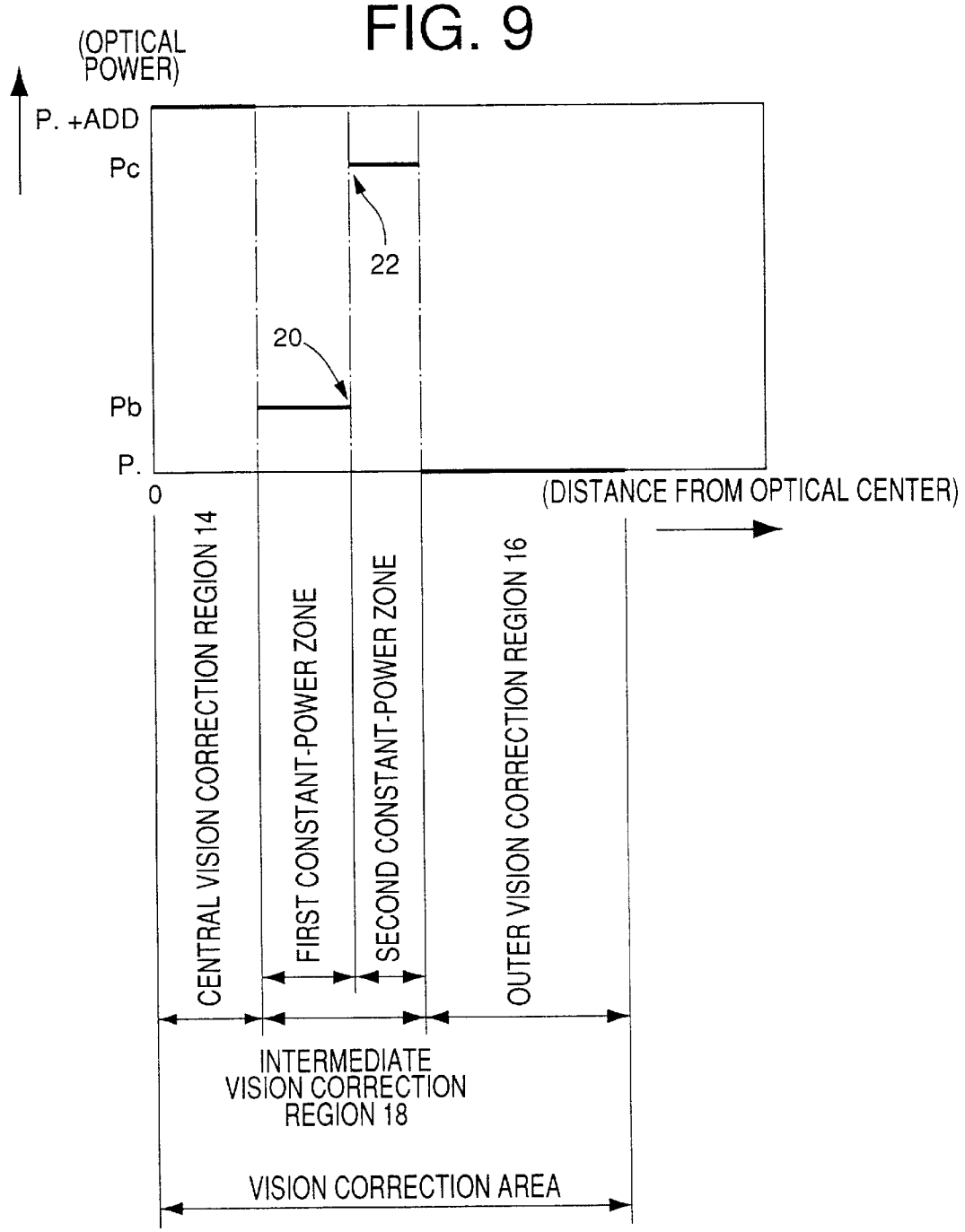
FIG. 9 is a graph showing yet another example of the optical power distribution of the contact lens.

Each of the distribution patterns of FIGS. 8 and 9 has two constant-power radial zones in the intermediate vision correction region 18. In the distribution pattern of FIG. 8, the radially inner one of these two constant-power zones extends between the two first transition points 20, 20, while the other radially outer zone extends between the two second transition points 22, 22. In the distribution pattern of FIG. 9, the radially outer end of the radially inner one of the two constant-power zones is defined by the first transition point 20, while the radially inner end of the other radially outer zone is defined by the second transition point 22. The first and second transition points 20, 22 are radially aligned with each other. To assure high degrees of visual acuity of near and distant objects through the central and outer vision correction regions 14, 16, it is preferable to determine the radial dimension of each constant-power radial zone in the intermediate vision correction region 18 such that the radial dimension is smaller than those of the central and outer vision correction regions 14, 16.

Figure 5:
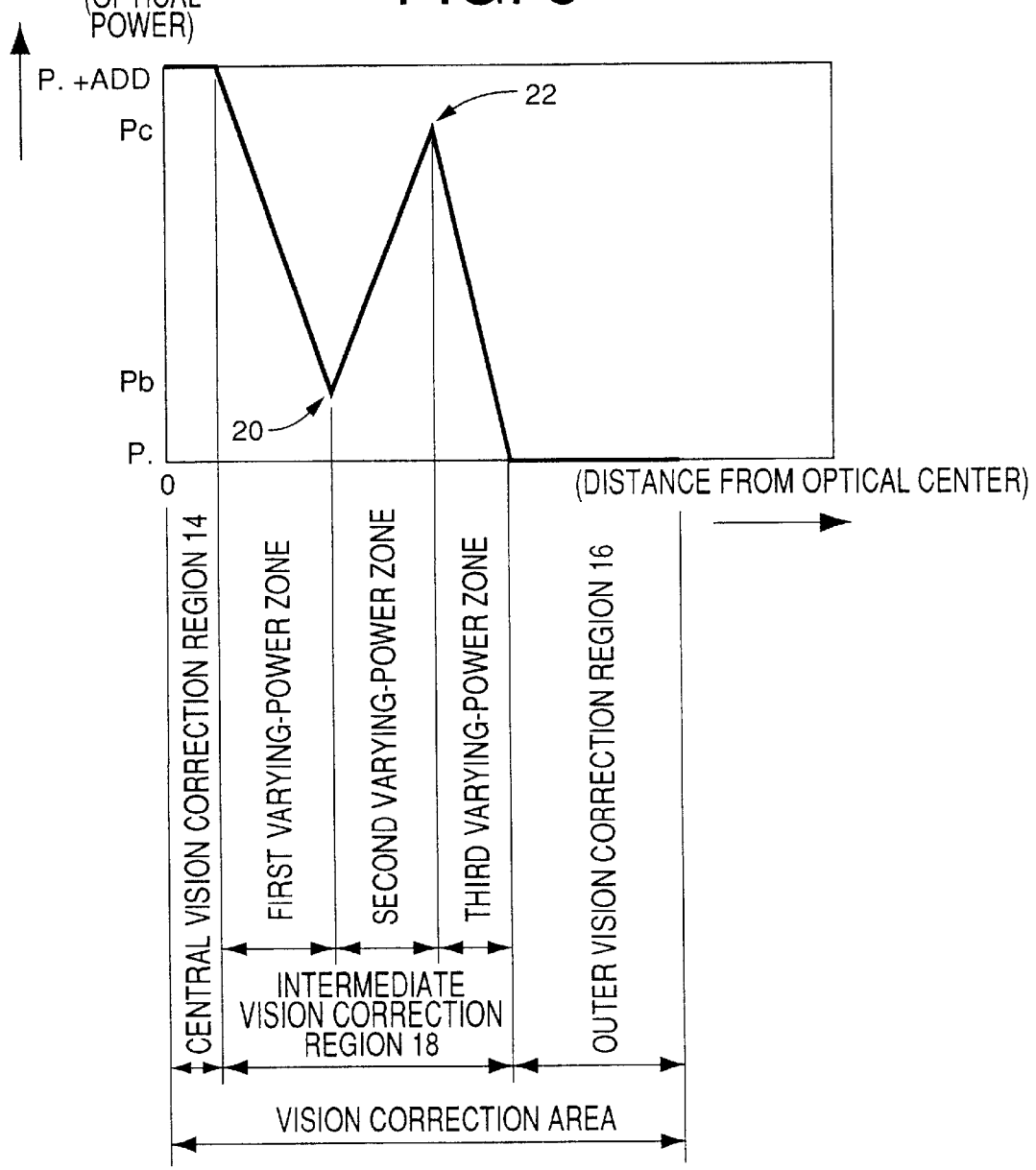
FIG. 5 is a graph showing a further example of the optical power distribution.
Figure 6:
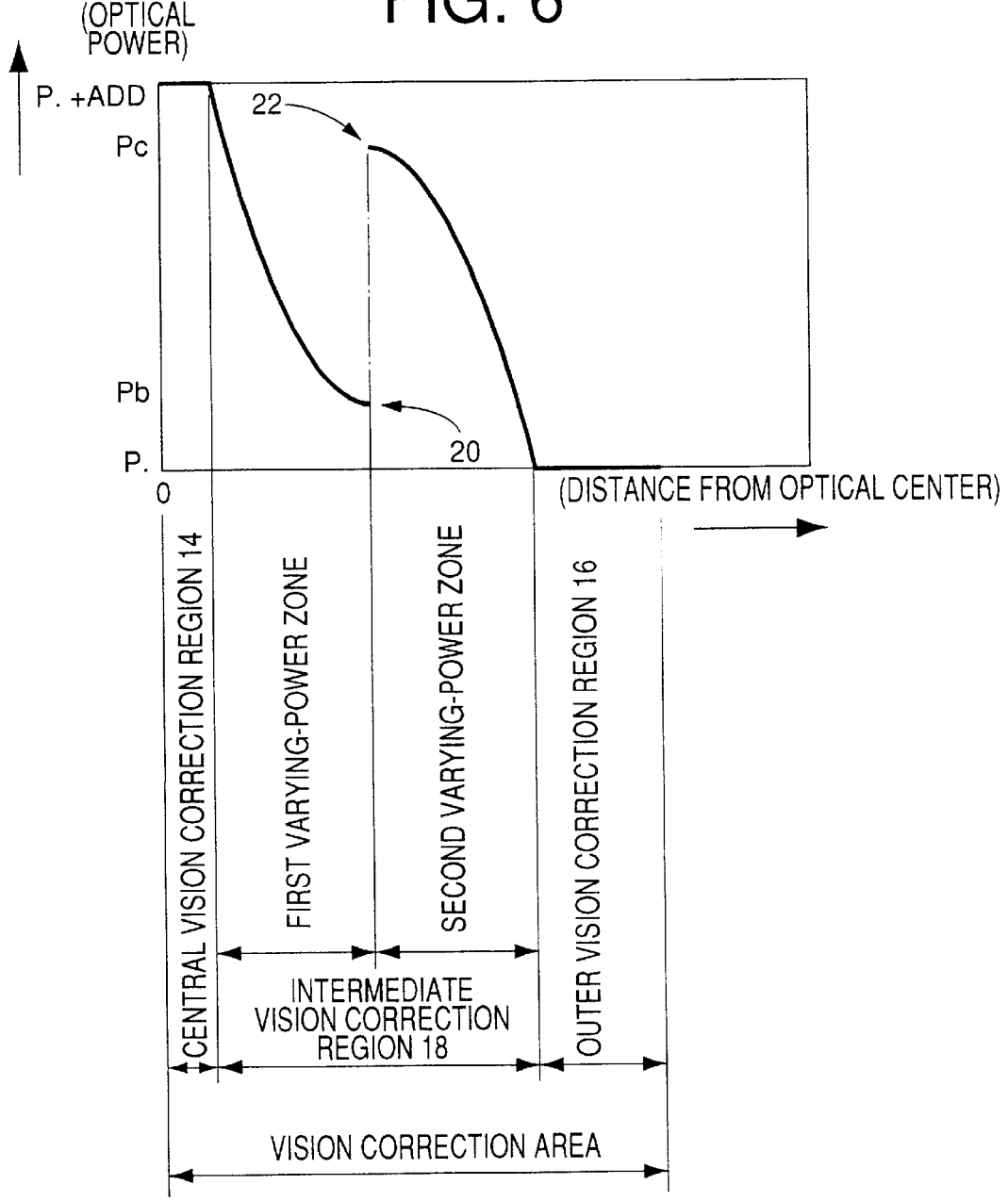
FIG. 6 is a graph showing a still further example of the optical power distribution of the contact lens.

As described above, each of the first and second transition points 20, 22 is located at each junction between adjacent ones of at least two radial zones of the intermediate vision correction region 18 in which the optical power varies continuously or is held constant. At each transition point 20, 22 (each junction), the direction of change of the optical power is switched (FIGS. 3–5, 7 and 10–13), or the optical power varies in steps (FIGS. 6 and 9). Alternatively, the continuous change of the optical power is terminated at the transition point 20, 22 (FIG. 8). In the distribution patterns of FIGS. 8 and 9, the 40 transition points 20, 22 define the constant-power radial zones of the intermediate vision correction regions 18. By suitably determining the positions of the first and second transition points 20, 22, the visual acuity of the intermediate objects can be suitably adjusted, that is, can be improved over the entire area of the intermediate vision correction region 18, or at a particular intermediate distance or at two or more particular intermediate distances. The positions of the transition points 20, 22 may define the maximal and minimal points or extreme points of the curves which represent the distribution patterns (FIGS. 3–8 and 10–13), or the optical power values of the constant-power radial zones (FIG. 8 and 9). The transition points 20, 22 define the radial zones of the intermediate vision correction region 18 which have respective distribution patterns of optical power, such that the two adjacent radial zones on the opposite sides of each transition point 20, 22 have different optical power distribution patterns or different optical power values. Where the constant-power radial zones are provided, these zones may be tuned to the desired optical power values corresponding to respective different intermediate distances. Further, the positions of the transition points 20, 22 may define both the extreme values (maximal and minimal values) of the optical power distribution curves and the optical power values of the constant-power radial zones (FIG. 8). By determining the optical distribution of the intermediate vision correction region 18 as described above, a considerably high degree of visual acuity of the intermediate objects may be obtained even where the optical center axis P of the vision correction region 12 is more or less offset from the center of the pupil of the lens wearer. In other words, the intermediate vision correction region 18 whose radial optical power distribution is determined as described above provides a relatively large amount of tolerance of radial orientation of the contact lens 10 with respect to the pupil.

As discussed above, the optical power continuously varies over the entire radial distance of the intermediate vision correction region 18 in the contact lenses of FIGS. 3–5, 7, 8 and 10–13, but the optical power of the region 18 varies abruptly in steps in the contact lenses of FIGS. 6 and 9 wherein the optical power values defined by the first and second transition points 20, 22 at the junction of the two adjacent radial zones are considerably different from each other. In the former arrangement wherein the optical power continuously varies in the intermediate vision correction region 18, the wearing comfort of the contact lens by the lens user is relatively improved, and the ghosting of images may be effectively prevented, permitting a high degree of visual acuity of the intermediate objects in general. In the latter arrangement wherein the optical power varies in steps at a given radial point of the intermediate vision correction region 18 which is given by the transition points 20, 22, the two constant-power radial zones on the opposite sides of the transition points 20, 22 may be suitably adjusted to the specific optical power values for clear viewing of the objects at respective particular intermediate distances. Further, the intermediate vision correction region 18 may have at least one varying-power radial zone and at least one constant-power radial zone as in the embodiment of FIG. 8. Thus, the visual acuity of the intermediate objects may be suitably adjusted by suitably determining the rate of change of the optical power in the varying-power radial zones and/or the optical power values of the constant-power radial zones.

As described above, the overall visual acuity of the intermediate objects may be improved where the optical power is continuously changed over the entire area of the intermediate vision correction region 18. On the other hand, the constant-power radial zones defined by the transition points 20, 22 may be suitably tuned to desired particular intermediate distances, for assuring a high degree of visual acuity of objects at those particular intermediate distances, as in the embodiment of FIGS. 8 and 9. Where the optical power continuously changes near the transition points 20, 22 on one side of each transition point, the optical power may abruptly change between the values of the transition points 20, 22, as in the embodiment of FIG. 6, or may alternatively be held constant at the values of the transition points 20, 22, in the constant-power radial zones, as in the embodiment of FIG. 8. In these embodiments of FIGS. 6 and 8 as well as the embodiment of FIG. 9, the intermediate vision correction region 18 provides a high degree of visual acuity of objects at desired intermediate distances.

Figure 4:
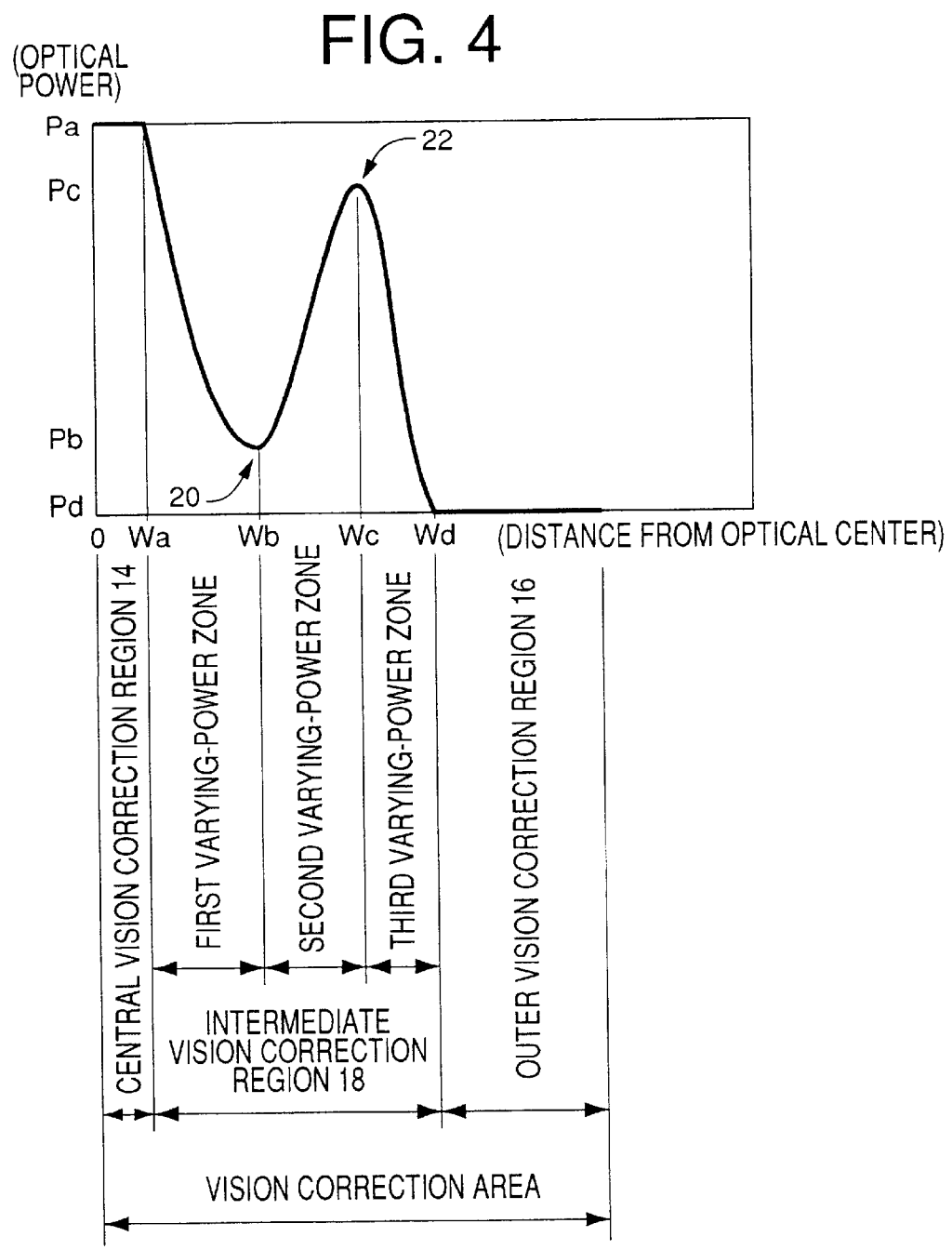
FIG. 4 is a graph showing another example of the optical power distribution of the contact lens.
Figure 10:
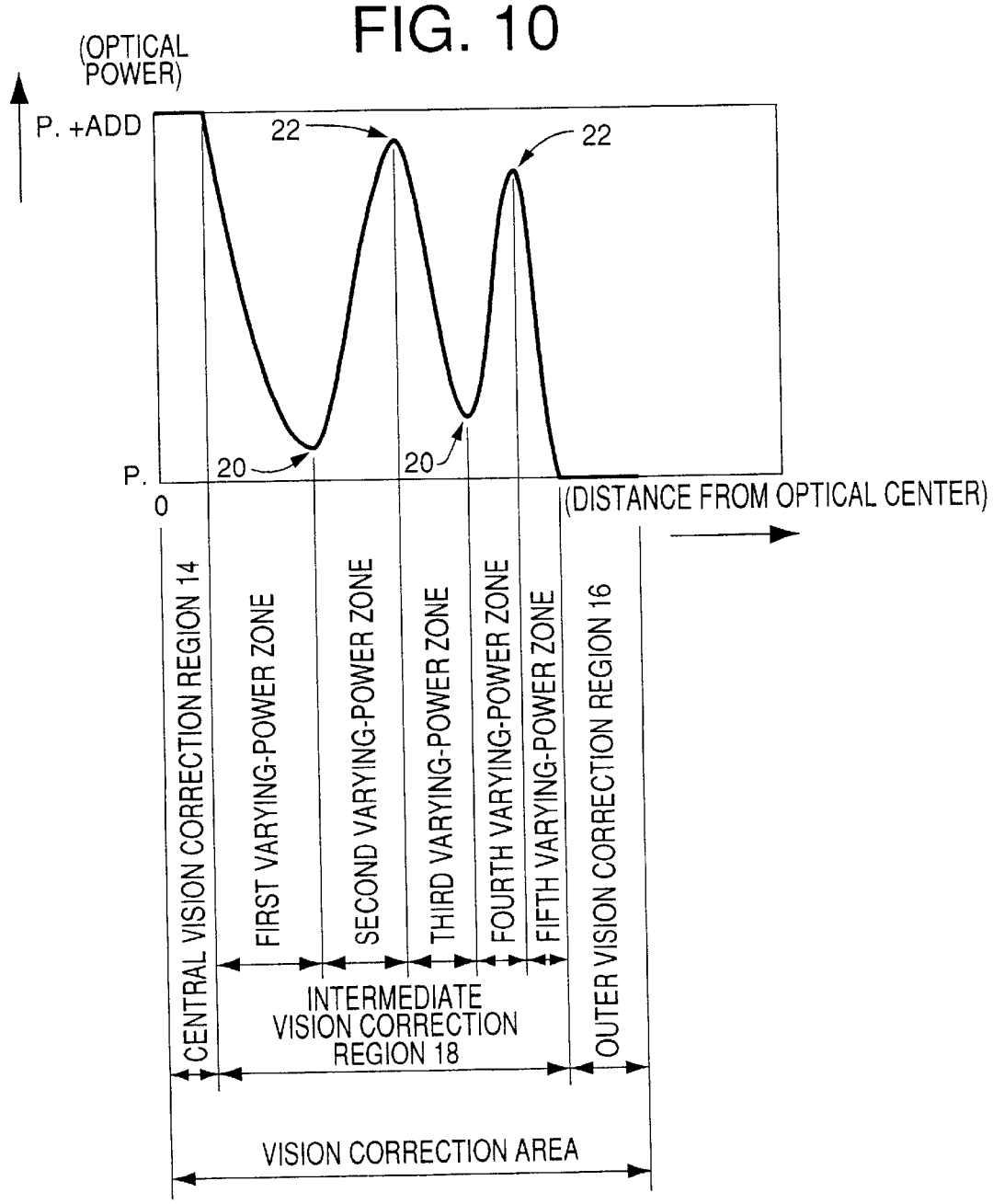
FIG. 10 is a graph showing a further example of the optical power distribution of the contact lens.

The optical power in the radial zones of the intermediate vision correction region 18 which are relatively adjacent to the central and outer vision correction regions 14, 16 may be continuously changed at a rate which changes in the radial direction. For instance, the rate of change (rate of increase or decrease) of the optical power in a portion or portions of the radial zones adjacent to the central and outer vision correction regions 14, 16 may be continuously and smoothly reduced to zero, so that the optical power in the above portion or portions smoothly changes to the constant optical power value or values of the region or regions 14, 16. However, the optical power in these portions adjacent to the regions 14, 16 may be changed at a constant rate as in the embodiment of FIG. 5. For example, the constant rate of change of the optical power in the radial zones adjacent to the regions 14, 16 may be abruptly reduced to zero at the junctions, so that optical power in these radial zones abruptly changes to the constant values of the regions 14, 16. In this case, there exist relatively clear boundaries in the optical power between the central vision correction region 14 and the intermediate vision correction region 18, and between the outer vision correction region 14 and the region 18, whereby the visual acuity of the near and distant objects near the intermediate objects can be improved.

Where the optical power continuously varies in the intermediate vision correction region 18 in the radial direction, the distribution of the optical power may be suitably determined so as to meet various requirements of optical characteristics. In the embodiment of FIG. 5, the radial distribution of the optical power in each of the first, second and third varying-power radial zones is represented by a polynomial of the first order. In the embodiments of FIGS. 3, 4, 7, 8 and 11–13, the radial distribution of the optical power in a first varying-power radial zone between the central vision correction region 14 and the first transition point 20 nearest to the region 14, and the radial optical power distribution in a third varying-power radial zone between the outer vision correction region 16 and the second transition point 22 nearest to the region 16 are represented by respective polynomial equations of the second or higher order, while the radial optical power distribution in a second varying-power radial zone between those first and second transition points 20, 22 (between the radially inner first and second transition points 20, 22 in FIG. 8) is represented by a polynomial equation of the third or higher order. In the embodiment of FIG. 10 wherein the two pairs of first and second transition points 20, 22 are provided, the radial optical power distribution in a first varying-power radial zone between the central vision correction region 14 and the first transition point 20 nearest to the region 14, and the radial optical power distribution in a fifth varying-power radial zone between the outer vision correction region 16 and the second transition point 22 nearest to the region 16 are represented by respective polynomial equations of the second or higher order, while the radial optical power distribution in each of second, third and fourth radial zones between the adjacent transition points 20, 22, 20, 22 is represented by a polynomial equation of the third or higher order. In the embodiments of FIGS. 3, 4, 7 and 11–13, the radial optical power distribution in any of the varying-power radial zones may be represented by a polynomial equation of the fifth or higher order, so that the optical power continuously varies such that the rate of change continuously and smoothly varies.

Figure 11:
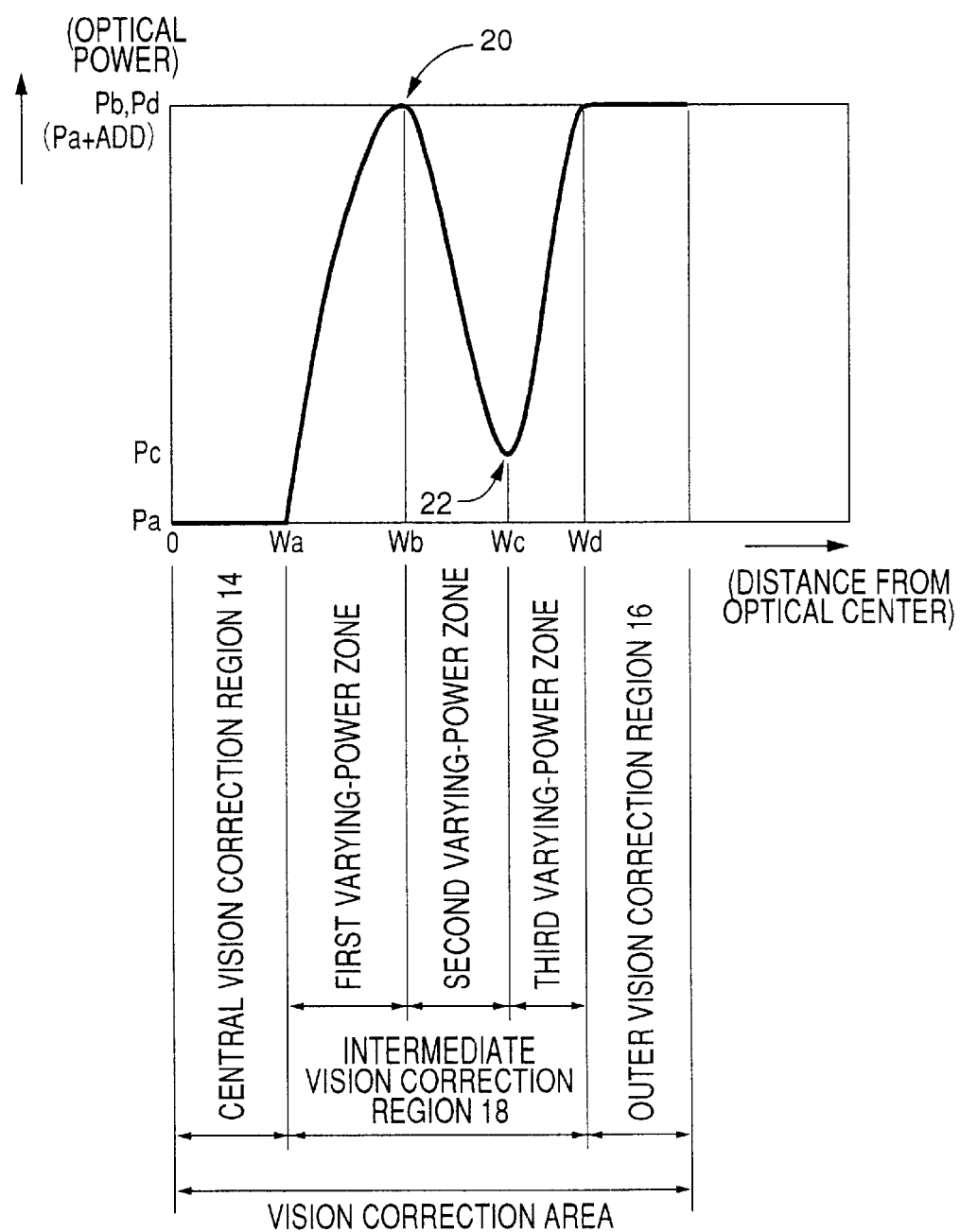
FIG. 11 is a graph showing a still further example of the optical power distribution of the contact lens.
Figure 12:
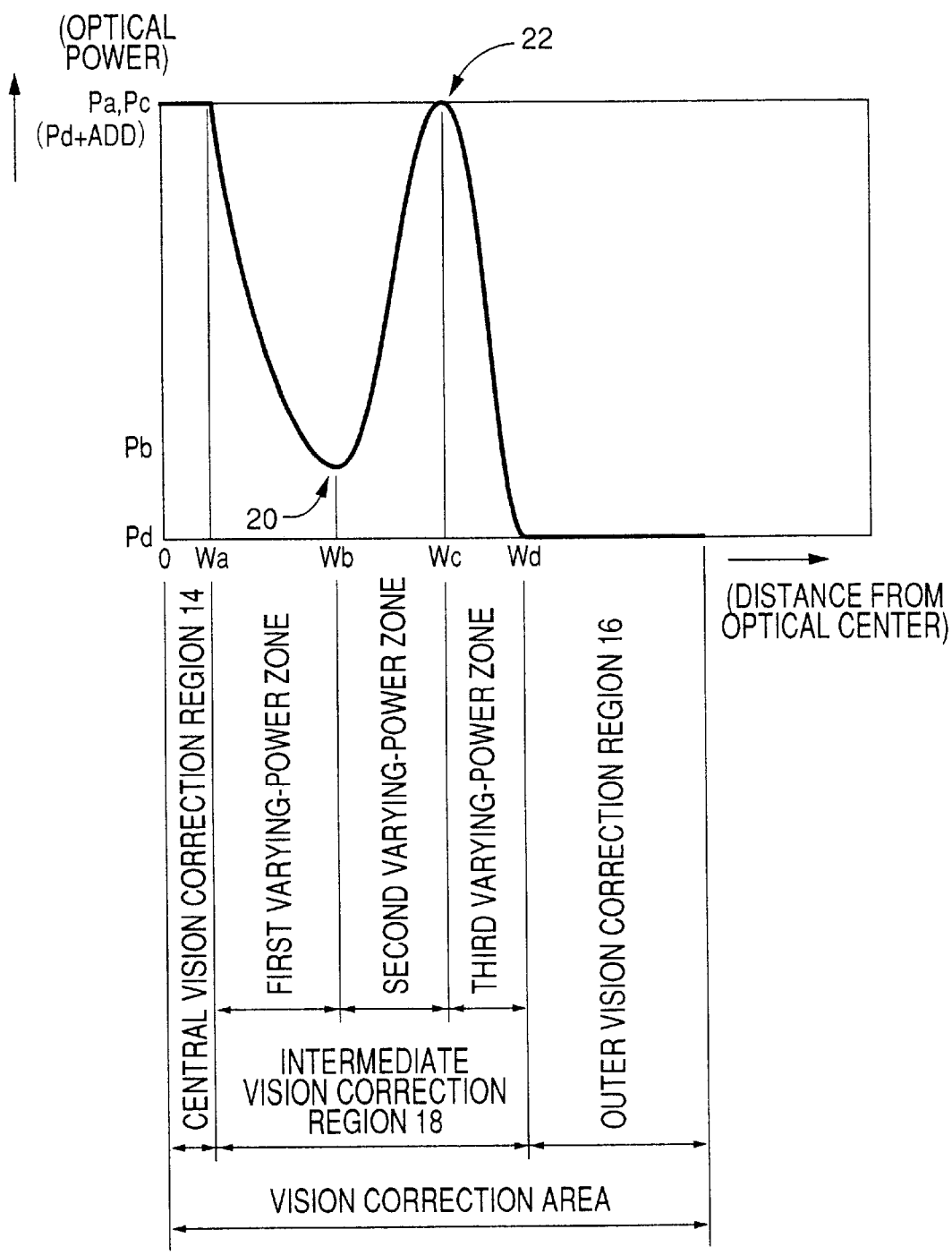
FIG. 12 is a graph showing a yet further example of the optical power distribution of the contact lens.
Figure 13:
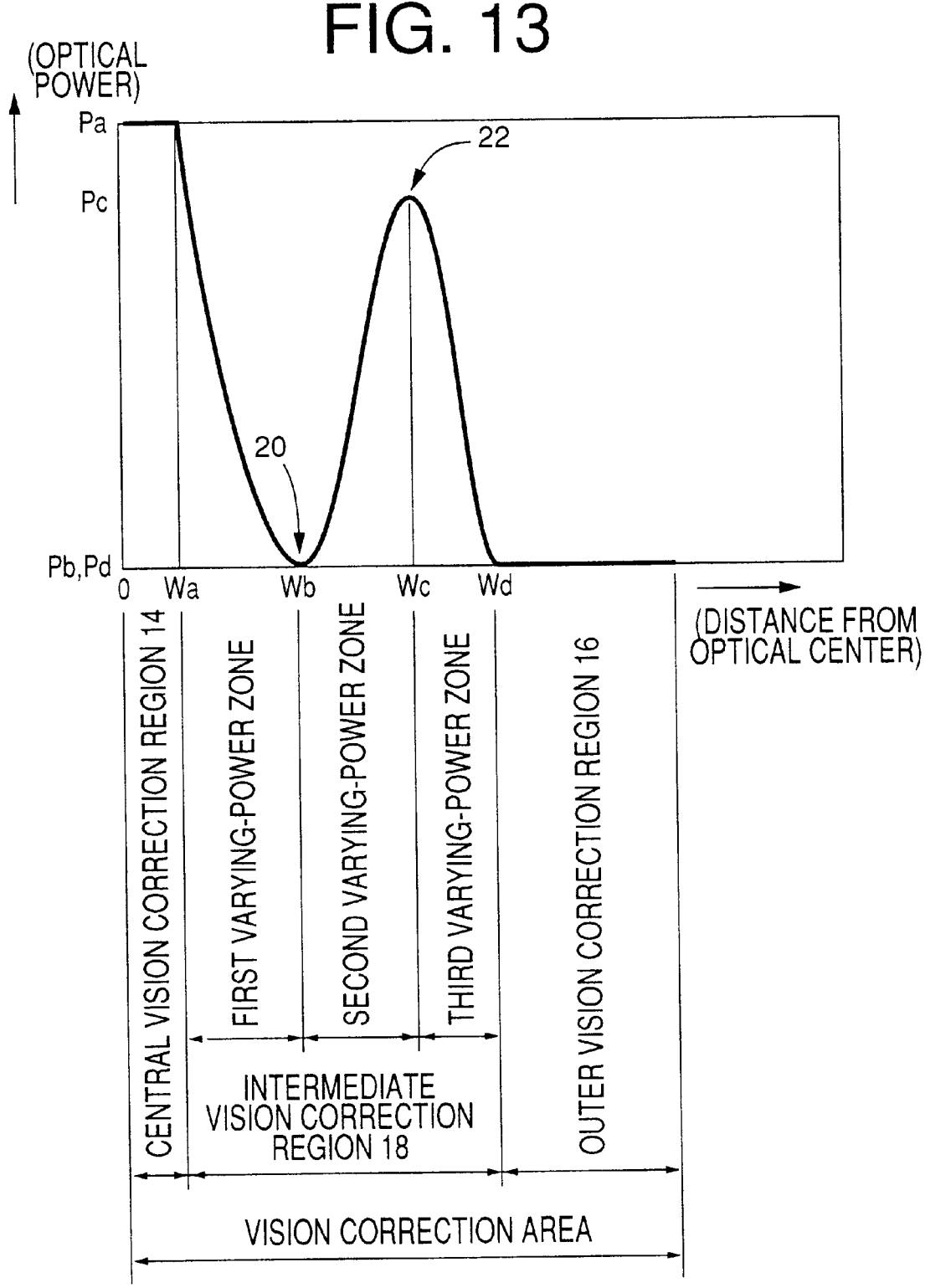
FIG. 13 is a graph showing another example of the optical power distribution of the contact lens.

The optical power values Pb and Pc at the respective first and second transition points 20, 22 may be determined as needed. In the embodiments of FIGS. 11–13, the optical power at one of the first and second transition points 20, 22 is made equal to that of the central or outer vision correction region 14, 16. In these embodiments, the transition point 20, 22 at which the optical power is equal to that of the central or outer region 14, 16 is given by a maximal or minimal value (extreme value), so that the optical power continuously changes on the opposite sides of the transition point 20, 22 in question in the radial direction such that the direction of change of the optical power changes at the transition point 20, 22. Namely, in the embodiment of FIG. 11, the first transition point 20 at which the optical power is equal to that of the outer vision correction region 16 is given by a maximal value to which the optical power continuously increases in the first varying-power radial zone in the radially outward direction and from which the optical power continuously decreases in the second varying-power radial zone in the radially outward direction. In the embodiment of FIG. 12, the second transition point 22 at which the optical power is equal to that of the central vision correction region 14 is given by a maximal value to which the optical power continuously increases in the second varying-power radial zone in the radially outward direction and from which the optical power continuously decreases in the third varying-power radial zone in the radially outward direction. In the embodiment of FIG. 13, the first transition point 20 at which the optical power is equal to that of the outer vision correction region 16 is given by a minimal value to which the optical power continuously decreases in the first varying-power radial zone and from which the optical power continuously increases in the second varying-power radial zone. These arrangements of FIGS. 11–13 permits an improved degree of visual acuity of the intermediate objects, with reduced ghosting of images. However, the intermediate vision correction region 18 may include a constant-power radial zone in which the optical power is equal to that of the central or outer vision correction region 14, 16. For instance, the embodiment of FIG. 8 may be modified such that one of the first and second constant-power radial zones defined by the two first or second transition points 20 or 22 in the intermediate vision correction region 18 has a constant optical power value equal to that of the central or outer vision correction region 14, 16.

The arrangements of FIGS. 11 and 12 wherein the optical power at the first or second transition point 20, 22 is made equal to the near vision correction region (the outer vision correction region 16 in the embodiment of FIG. 11, and the central vision correction region 14 in the embodiment of FIG. 12) are more preferable than the arrangement of FIG. 13 wherein the optical power at the first transition point 20 is made equal to the distant vision correction region (the outer vision correction region 16). The arrangements of FIGS. 11 and 12 permit an improvement in the visual acuity of the near objects, which tend to be deteriorated by a general arrangement to give priority to the distant vision correction. The embodiments of FIGS. 11–13 wherein the optical power at one of the first and second transition points 20, 22 is made equal to that of one of the central and outer vision correction regions 14, 16 are further arranged such that the optical power at the other of the first and second transition points 20, 22 is determined to be relatively closer to that of the other of the central and outer vision correction regions 14, 16, so as to provide a high degree of visual acuity of the intermediate objects.

In the embodiment of FIG. 11, for example, the central vision correction region 14 serves as the distant vision correction region having the optical power value Pa (diopter: hereinafter abbreviated as "Dptr."), while the outer vision correction region 16 serves as the near vision correction region having the optical power value Pd (Dptr.)=Pa+ADD, and the intermediate vision correction region 18 has one radially inner first transition point 20 at which the optical value is equal to the optical power value Pb (Dptr.) of the outer or near vision correction region 16, and one radially outer second transition point 22 having the optical power value Pc (Dptr.) which is determined so as to satisfy the following formula:

$$Pa < Pc < Pa + ADD/2$$

More preferably, the optical power Pc at the second transition point 22 is determined so as to satisfy the following formula:

$$Pa + 0.25 \leq Pc < Pa + ADD/2$$

The intermediate vision correction region 18 of the contact lens 10 according to the present invention preferably has a radial width or dimension of 0.5–3.5 mm. If the radial dimension of the region 18 is smaller than 0.5 mm, the visual acuity of the intermediate objects may be insufficient. If the radial dimension is larger than 3.5 mm, the visual acuity of the near and distant objects may be insufficient.

According to the present invention, the central and outer vision correction regions 14, 16 may be used as the near and distant vision correction regions, respectively, or vice versa. Where the central vision correction region 14 is used as the near vision correction region while the outer vision correction region 16 is used as the distant vision correction region, as indicated in the graphs of FIGS. 3–6, 8–10, 12 and 13, it is preferable that the optical power values Pb (Dptr.) and Pc (Dptr.) at the respective first and second transition points 20, 22 be determined so as to satisfy the following formulas (I) and (II), respectively, and the following formulas (I') and (II"), respectively:

$$Pd + 0.25 \leq Pb < Pd + ADD/2 \tag{I}$$

$$Pd + ADD/2 \leq Pc \leq Pd + ADD \tag{II}$$

$$Pd \leq Pb < Pd + ADD/2 \tag{I'}$$

$$Pd + ADD/2 \leq Pc \leq Pd + ADD - 0.25 \tag{II'}$$

In the above formulas, Pd (Dptr.) represents the optical power value of the outer distant vision correction region 16 while "ADD (Dptr.)" represents an additional value by which the optical value of the central near vision correction region 14 is higher than the optical power Pd of the region 16.

Further, the radial distribution of the intermediate vision correction region 18 including the first and second transition points 20, 22 may be determined such that the optical values Pb and Pd at the transition points 20, 22 are both intermediate between the optical values of the central and outer vision correction regions 14, 16, and are not equal to either of the optical values Pb, Pc, as shown in the graphs of FIGS. 3–10, so that the intermediate vision correction region 18 provides a relatively high degree of visual acuity of objects at the desired intermediate distance or distances. For instance, the optical power Pb, Pc. are preferably determined so as to satisfy the following two formulas, respectively:

$$Pd + 0.25 \leq Pb < Pd + ADD/2$$

$$Pd + ADD/2 \leq Pc \leq Pd + ADD - 0.25$$

Irrespective of whether the central and outer vision correction regions 14, 16 are respectively used as the near and distant vision correction regions or vice versa, the intermediate vision correction region 18 advantageously includes one pair of first and second transition points 20, 22, so that these two transition points 20, 22 cooperate with the outer periphery of the central vision correction region 14 and the inner periphery of the outer vision correction region 16, to define a first, a second and a third varying-power radial zone, as indicated in the graphs of FIGS. 3–5, 7 and 11–13. In the first varying-power radial zone, the optical power continuously varies from the optical power value (Pd+ADD) of the central vision correction region 14 to the optical power value Pb at the first transition point 20. In the second varying-power radial zone, the optical power continuously varies from the optical power value Pb at the first transition point 20 to the optical power value Pc at the second transition point 22. In the third varying-power radial zone, the optical power continuously varies from the optical power Pc at the second transition point 22 to the optical power value Pd of the outer vision correction region 16. In the embodiment of FIG. 8, the first and second varying-power radial zones are spaced from each other by a first constant-power radial zone which is defined by the two first transition points 20 and at which the optical power value is held constant at Pb, while the second and third varying-power radial zones are spaced from each other by a second constant-power radial zone which is defined by the two second transition points 22 and at which the optical power value is held constant at Pc.

In the embodiments of FIGS. 3–5, 7 and 10–13, the first and second transition points 20, 22 are given as extreme values, so as to further reduce the problem of ghosting of images or further improve the visual acuity over a relatively wide range of intermediate objects. In the embodiments of FIGS. 3–6, 8, 10, 12 and 13, the central vision correction region 14 is used as the near vision correction region, and the rate of change of the optical power abruptly changes to zero at the junction between the intermediate and central vision correction regions 18, 14. In these embodiments, the optical power value in a radially intermediate part of the vision correction area 12 is relatively closer to the optical value of the distant vision correction region 16, so that a relatively large amount of light can be incident upon the pupil of the lens wearer through the central near vision correction region 14, upon viewing of the near objects, whereby the visual acuity of the near objects is accordingly improved.

In the present invention, it is preferable to determine the distribution of the optical power in each of the first, second and third varying-power radial zones of the intermediate vision correction region 18, as described below by reference to some formulas wherein y, y', x, Pa, Pb, Pc, Pd, Wa, Wb, Wc and Wd represent the following (See FIG. 4):

y: optical power value in the appropriate radial zone;
y': derivative of the optical power y;
x: distance from the optical center axis P of the vision correction area 12;
Pa: optical power value of the central vision correction region 14;
Pb: optical power value at the first transition point 20 of the intermediate vision correction region 18;
Pc: optical power value at the second transition point 22 of the intermediate vision correction region 18;
Pd: optical power value of the outer vision correction region 16;
Wa: radial distance from the optical center axis P to a boundary between the central and intermediate vision correction regions 14, 18;
Wb: radial distance from the optical center axis P to the first transition point 20;
Wc: radial distance from the optical center axis P to the second transition point 22; and
Wd: radial distance from the optical center axis P to a boundary between the intermediate and outer vision correction regions 18, 16.

Namely, the radial distribution of the optical power y in the first varying-power radial zone of the intermediate vision correction region 18 is represented by a curve in a rectangular coordinate system wherein the optical power y is taken along the ordinate (y axis) while the radial distance x is taken along the abscissa (x axis). In the example of FIG. 4, the optical power values Pa and Pd of the central and outer vision correction regions 14, 16 are represented by two straight lines parallel to the abscissa (x axis). One of opposite ends of the curve representing the optical power y in the first varying-power radial zone is located at a coordinate point (Wa, Pa), while the other end is located at a coordinate point (Wb, Pb), which represents the minimal value. Therefore, the derivative y' of the optical power y in the first varying-power radial zone of the intermediate vision correction region 18 in the embodiment of FIG. 4 is represented by the following equation:

$$y'=(x-Wa)(x-Wb)$$

Therefore, the optical power y1 in the first varying-power radial zone is represented by the following equation including coefficients E1 and F1:

$$y1=E1(x^3/3-x^2(Wa+Wb)/2+x \cdot Wa \cdot Wb)+F1$$

When the value Wa and Pa are substituted for the values x and y in the above equation, respectively, the following equation (1) is obtained. When the values Wb and Pb are substituted for the values x and y in the above equation, respectively, the following equation (2) is obtained.

$$Pa=E1(Wa^3/3-Wa^2(Wa+Wb)/2+Wa \cdot Wa \cdot Wb)+F1 \qquad (1)$$

$$Pb=E1(Wb^3/3-Wb^2(Wa+Wb)/2+Wb \cdot Wa \cdot Wb)+F1 \qquad (2)$$

On the basis of the above equations (1) and (2), the coefficients E1 and F1 are obtained as follows:

$$E1=(Pa-Pb)/((Wa^3-Wb^3)/3-(Wa^2-Wb^2)(Wa+Wb)/2+(Wa-Wb)Wa \cdot Wb)$$

$$F1=Pa-E1(Wa^3/3-Wa^2(Wa+Wb)/2+Wa \cdot Wa \cdot Wb)$$

In the same manner, the optical power y in the second and third varying-power radial zones of the intermediate vision correction region 18 can be represented by the following equations:

[Optical power in the second varying-power radial zone]

$$y2=E2(x^3/3-x^2(Wb+Wc)/2+x \cdot Wb \cdot Wc)+F2$$

$$E2=(Pb-Pc)/((Wb^3-Wc^3)/3-(Wb^2-Wc^2)(Wb+Wc)/2+(Wb-Wc)Wb \cdot Wc)$$

$$F2=Pb-E2(Wb^3/3-Wb^2(Wb+Wc)/2+Wb \cdot Wb \cdot Wc)$$

[Optical power in the third varying-power radial zone]

$$y3=E3(x^3/3-x^2(Wc+Wd)/2+x \cdot Wc \cdot Wd)+F3$$

$$E3=(Pc-Pd)/((Wc^3-Wd^3)/3-(Wc^2 Wd^2)(Wc+Wd)/2+(Wc-Wd)Wc \cdot Wd)$$

$$F3=Pc-E3(Wc^3/3-Wc^2(Wc+Wd)/2+Wc \cdot Wc \cdot Wd)$$

The distribution of the optical power y in each of the first, second and third varying-power radial zones of the intermediate vision correction region 18, in particular, the distribution of the optical power y in the first varying-power radial zone, may be represented by an expression of the fourth order, rather than the above-described expression of the third order. Namely, a rate of change A of the optical power in the first varying-power radial zone may be represented by the following equation, for instance:

$$A=(Pa-Pb)/(Wa-Wb)^4$$

Accordingly, the optical power y of the first varying-power radial zone at the radial distance x from the optical center axis P is represented by the following equation:

$$y=(Pa-Pb)(x-Wb)^4/(Wa-Wb)^4+Pb$$

Figure 7:
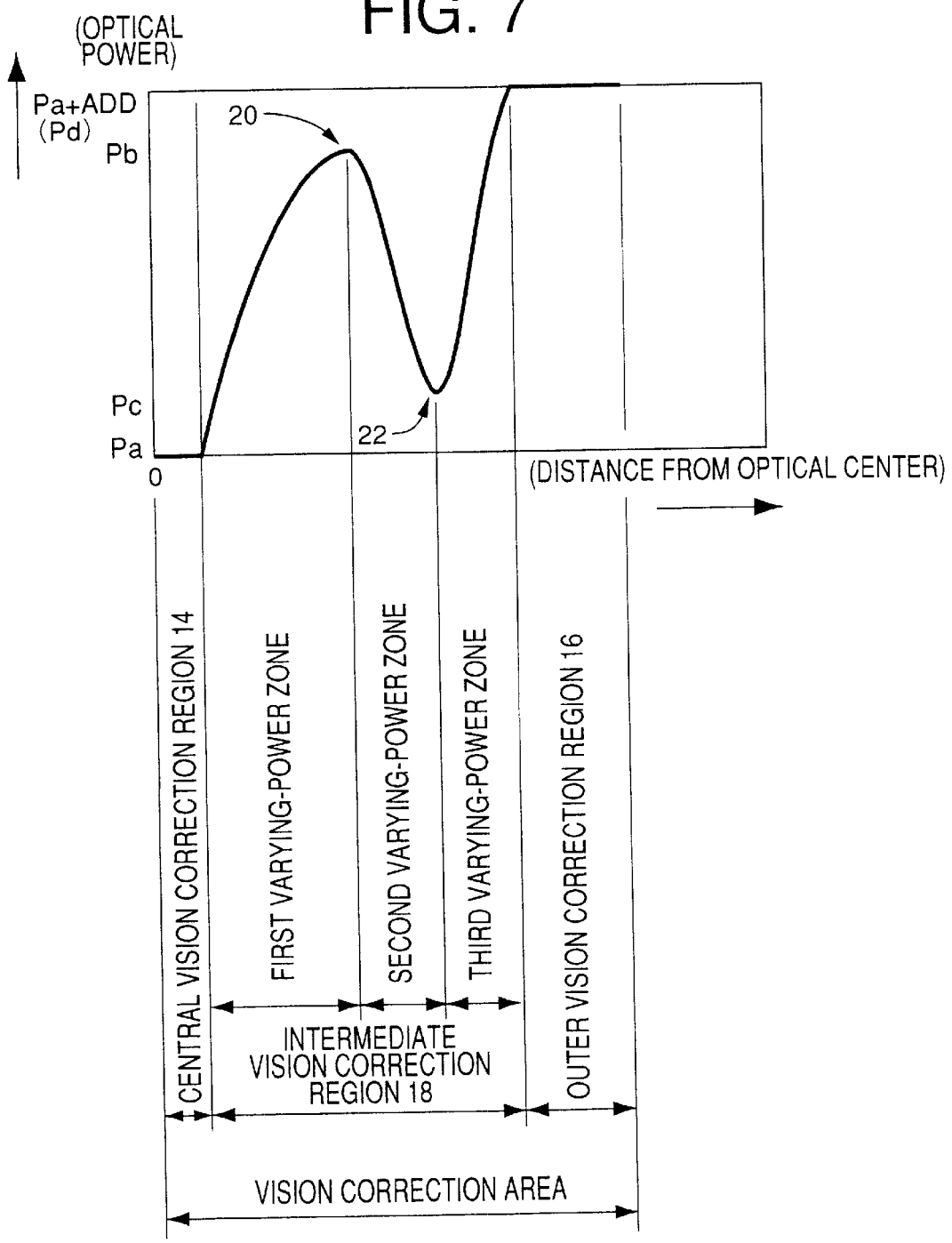
FIG. 7 is a graph showing a yet further example of the optical power distribution of the contact lens.

When the optical power y of the first varying-power radial zone is represented by the above equation where the central and outer vision correction regions 14, 16 are used as the near and distant vision correction regions, respectively, a relatively large amount of light can be incident upon the central vision correction region 14, permitting an improvement in the visual acuity of the near objects.

Where the central and outer vision correction regions 14, 16 are used as the distant and near vision correction regions, respectively, as in the embodiment of FIG. 7, too, the radial distribution of the optical power y in each of the first, second and third varying-power radial zones of the intermediate vision correction region 18 may be determined as described above with respect to the contact lens wherein the central vision correction region 14 is used as the near vision correction region. Namely, the distribution of the optical power in the intermediate vision correction region 18 may be determined such that the optical power values at the first and second transition points 20, 22 are represented by respective maximal and minimal values (extreme values) of a curve, while the rate of change of the optical power abruptly changes to zero at the junctions between the intermediate vision correction region 18 and the central and outer vision correction regions 14, 16.

Where one pair of first and second transition points 20, 22 is provided in the intermediate vision correction region 18 to define the first, second and third varying-power radial zones, one of the the optical power values at the first and second transition points 20, 22 may be advantageously made equal to one of the constant optical power values of the central and outer vision correction regions 14, 16, as in the embodiments of FIGS. 11–13, so as to reduce the problem of ghosting of images and assure improved visual acuity of objects at the intermediate distances.

While the presently preferred embodiments of this invention have been described in detail for illustrative purpose only, it is to be understood that the invention is not limited to the details of these illustrated embodiments, and may be otherwise embodied.

The principle of the present invention is applicable to various types of ocular lenses irrespective of the applications and materials. For instance, the present invention is applicable to hard contact lenses and soft contact lenses. The hard contact lenses include a non-rigid gas permeable type formed of PMMA, for example, and a rigid gas permeable type (RGP). The soft contact lenses include a hydrophilic or hydrated type and a hydrophobic type. Obviously, the present invention is applicable to intraocular lenses.

The ocular lens according to the present invention may be produced by any known methods. For instance, the ocular lens is produced by first cutting a lens blank to provide a precursor of an intended lens, and then shaping or forming the inner and outer surfaces of the precursor by a suitable cutting or machining operation. The ocular lens may be formed by a molding operation using a pair of molds which respectively give intended inner and outer surfaces of the lens. Alternatively, one of the opposite surfaces of the ocular lens is formed by molding while the other surface is formed by cutting. Further, a molded lens blank may be subjected to a cutting operation to form the desired inner and outer surfaces configurations. When the ocular lens is formed by cutting, the surfaces of the obtained ocular lens have a high degree of accuracy of configuration. When the ocular lens is formed by molding, the ocular lens can be produced with high efficiency. By combining the cutting operation and the molding operation, the ocular lens can be produced with high efficiency while assuring high accuracy of the surface configuration.

Figure 14:
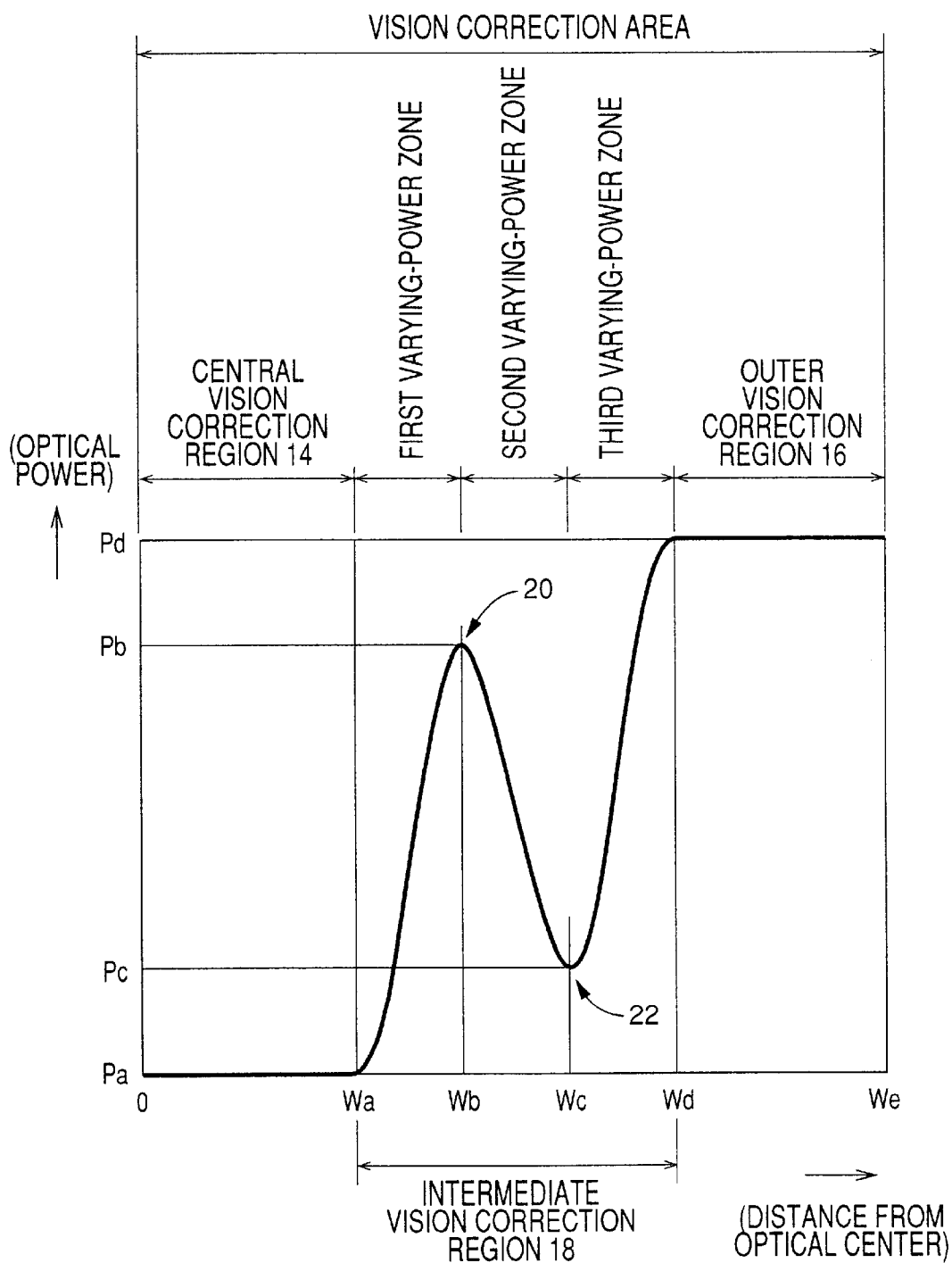
FIG. 14 is a graph showing an example of the optical power distribution of a contact lens according to another embodiment of this invention.

Referring next to FIG. 14, there will be described another embodiment of this invention wherein the central and outer vision correction regions 14, 16 are used as the distant and near vision correction regions, respectively, which have the respective optical power values Pa and Pd whose difference is equal to ADD, while the intermediate vision correction region 18 consists of the three varying-power radial zones whose boundaries are defined by the first and second transition points 20, 22. As in the embodiment of FIG. 7, the optical power value Pb at the first transition point 20 is closer to the optical power value Pd of the outer near vision correction region 16, while the optical power value Pc at the second transition point 22 is closer to the optical power Pa of the central distant vision correction region 14.

In the embodiment of FIG. 14, the optical power values Pb and Pc at the respective first and second transition points 20, 22 are determined so as to satisfy the following formulas (III) and (IV), respectively:

$$Pa+(Pd-Pa)2/3 \leq Pb \leq Pd \qquad \text{(III)}$$

$$Pa+0.25 \leq Pc \leq Pa+(Pd-Pa)/3 \qquad \text{(IV)}$$

The optical power values Pb and Pc at the first and second transition points 20, 22 are given by maximal and minimal values, respectively, so as to permit high visual acuity of objects at intermediate distances between the far and near distances to which the optical power values Pa and Pd are tuned. By suitably determining the optical power values Pb, Pc, high visual acuity of objects can be obtained over a wide range of the intermediate distance, or for the particular intermediate distances.

The determination of the optical power values Pb and Pc to be closer to the respective values Pd and Pa of the near and distant vision correction regions 16, 14 is advantageous to assure high visual acuity of the near and distant objects even if the contact lens is displaced on the user's eye. If the outer near vision correction region 16 and the radially outer portion of the intermediate vision correction region 18 whose optical value is relatively close to the distant vision correction optical value Pa are more or less displaced from the pupil of the user's eye, the central distant vision correction region 14 and the radially inner portion of the intermediate vision correction region 18 whose optical value is relatively close to the near vision correction optical value Pa are still available for sufficient visual acuity of the distant and near objects. On the other hand, if the central distant vision correction region 14 and the radially inner portion of the intermediate region 18 whose optical value is relatively close to the near vision correction optical value Pd are more or less displaced from the pupil, the outer near vision correction region 16 and the radially outer portion of the intermediate region 18 whose optical value is close to the distant vision correction optical value Pa are still available for sufficient visual acuity of the near and distant objects.

The distribution of the optical power in the intermediate vision correction region 18 in the embodiment of FIG. 14 has other advantages as described above with respect to the embodiment of FIG. 7, in particular.

The formulas (III) and (IV) representing the optical power values Pb and Pc at the first and second transition points 20, 22 may also apply to a contact lens wherein the central and outer vision correction regions 14, 16 are used as the distant and near vision correction regions and wherein the optical power value Pb at the first transition point 20 is equal to the optical power value Pd of the near vision correction region 16. In other words, the embodiment of FIG. 11 wherein the optical power values Pc is determined so as to satisfy the formula Pa<Pc<Pa+ADD/2 as described above may be modified such that the optical power values Pb and Pc satisfy the above-indicated formulas (III) and (IV), respectively.

The radial dimensions of the central, outer and intermediate vision correction regions 14, 16, 18 and the radial positions of the first and second transition points 20, 22 of the region 18 in the embodiment of FIG. 14 and the above-indicated modification of FIG. 11 may be suitably determined so as to meet the desired vision correction requirements. For achieving satisfactory degrees of visual acuity of the distant, near and intermediate objects, however, the radial dimension W of each of the first, second and third varying-power radial zones of the region 18 is preferably determined so as to satisfy the following formula (V):

$$0.1 \text{ mm} \leq W \leq 3.0 \text{ mm} \tag{V}$$

The radius Wa of the central vision correction region 14 is also preferably selected within a range of 0.1–3.0 mm. Namely, $0.1 \text{ mm} \leq Wa \leq 3.0 \text{ mm}$.

The outside diameter of the outer vision correction region 16, that is, the outside diameter We of the vision correction area 12 in the embodiment of FIG. 14 and the modification of the embodiment of FIG. 11 must be large enough for the vision correction area 12 to cover an optically sufficient area of the pupil of the lens wearer.

The distribution of the optical power y in each of the first, second and third varying-power radial zones of the intermediate vision correction region 18 in the embodiment of FIG. 14 may be determined as described above with respect to the embodiment of FIG. 4 by way of example.

It is also noted that the various features described above with respect to the embodiments of FIGS. 7 and 11 are applicable to the embodiment of FIG. 14 and the above-indicated modification of FIG. 11.

Figure 15:
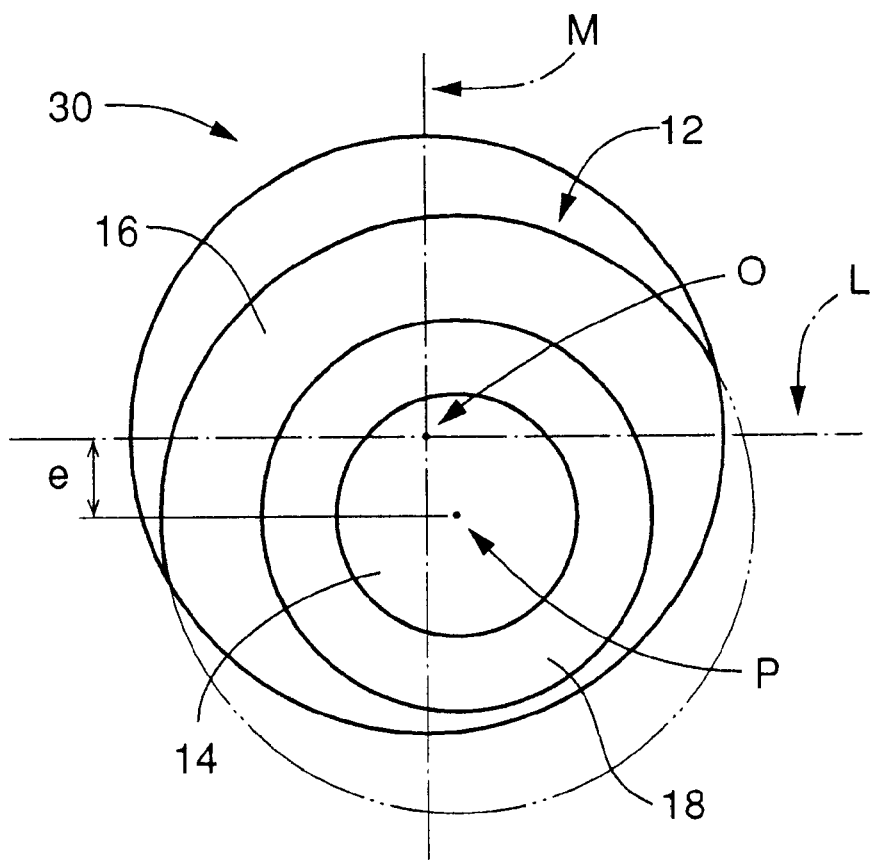
FIG. 15 is a plan view of a contact lens constructed according to a further embodiment of this invention.

While the contact lenses according to the embodiments illustrated above are the simultaneous vision type, the multifocal ocular lens of the present invention may be used as a translating vision type ocular lens, by suitably determining the offset distance of the optical center axis of the vision correction area 12 from the geometric center axis of the lens, as illustrated in FIG. 15. In the translating vision type ocular lens 30 shown in FIG. 15, the central and outer vision correction regions 14, 16 are used as the near and distant vision correction regions, respectively, and the optical center axis P of the vision correction area 12 (consisting of the central, intermediate and outer regions 14, 18, 16) is offset from the geometric center axis O in the downward direction by a radial distance "e". In FIG. 15, "L" and "M" represent respective horizontal and vertical lines which pass the geometric center axis O when the contact lens 30 is worn on the user's eye.

When the axis of the lens wearer who wears the thus formed translating vision type contact lens 30 is directed downwards while reading a book, for instance, a relatively wide area of the pupil of the wearer's eye is covered by the central near vision correction region 14, so that the wearer can obtain clear images of the relatively near object (e.g., book) and objects at an intermediate distance between the near and far distances. When the visual axis of the lens wearer is directed frontwards while driving a car, for instance, a relatively wide area of the pupil is covered by the outer distant vision correction region 16, so that the wearer can obtain clear images of the far objects.

In the contact lens 30, the downward offset distance "e" between the optical center axis P of the vision correction area 12 and the geometric center axis O of the contact lens is preferably 7.0 mm or smaller, so as to assure high visual acuity of the near and distant objects under normal living environment of the lens wearer. Preferably, the optical center axis P of the vision correction area 12 is offset from the geometric center axis O not only in the downward direction, but also in the horizontal direction (in the right direction as seen in FIG. 15) toward the nose of the lens wearer when the contact lens 30 is worn on the eye, so that the optical center axis P is easily aligned with the center of the pupil. The radial distribution of the optical power in the intermediate vision correction region 18 of this type of contact lens 30 may be determined as described above with respect to the contact lens 10 of the simultaneous vision type, so as to provide substantially the same advantages as described above.

Although the embodiment of FIG. 14 has one pair of first and second transition points 20, 22 in the intermediate vision correction region 18, two or more pairs of first and second transition points may be provided such that the first and second transition points are alternately located in the radial direction.

The embodiment of FIG. 14 may be modified such that constant-power radial zones whose optical power values Pb, Pc are determined by the first and second transition points 20, 22 may be provided between the varying-power radial zones in the intermediate vision correction region 18, as in the embodiment of FIG. 8.

Further, the embodiment of FIG. 14 may apply to the translating vision type contact lens as shown in FIG. 15.

It is to be understood that the present invention may be embodied with various other changes, modifications and improvements, which may occur to those skilled in the art, without departing from the spirit and scope of the invention defined in the following claims.

What is claimed is:

1. A multifocal ocular lens having a vision correction area which has different values of optical power and comprises:

a central vision correction region having a first optical power value;

an outer vision correction region located radially outwardly of said central vision correction region with a predetermined radial spacing therebetween and having a second optical power value different from said first optical power value; and an intermediate vision correction region located radially intermediate between said central and outer vision correction regions and having a distribution of optical power between said first and second optical power values, and wherein said intermediate vision correction region has at least one pair of a first transition point and a second transition point which is not radially inwardly spaced from said first transition point, said distribution of optical power of said intermediate vision correction region including two optical power values which are defined by said first and second transition points, respectively, and which are determined such that the optical power value defined by said second transition point is closer to said first optical power value of said central vision correction region than the optical power value defined by said first transition point.

2. A multifocal ocular lens according to claim 1, wherein said central, intermediate and outer vision correction regions are optically concentric with each other.

3. A multifocal ocular lens according to claim 1, wherein said first and second optical power values of said central and outer vision correction regions are substantially constant over an entire radial dimension thereof.

4. A multifocal ocular lens according to claim 1, wherein at least one of said two optical power values at said first and second transition points is given by an extreme value.

5. A multifocal ocular lens according to claim 1, wherein a distribution of the optical power value in at least one of radially end portions of said intermediate vision correction region which are adjacent to said central and outer vision correction regions is determined such that the optical power value in said at least one of said radially end portions abruptly changes to a corresponding one of said first and second optical power values, in a radial direction of said vision correction area.

6. A multifocal ocular lens according to claim 1, wherein said at least one of said first and second transition points defines a constant optical power value in a constant-power radial zone of said intermediate vision correction region.

7. A multifocal ocular lens according to claim 1, wherein one of said two optical power values defined by said first and second transition points is equal to one of said first and second optical values.

8. A multifocal ocular lens according to claim 1, wherein said first and second transition points are radially aligned with each other at a predetermined radial position in said intermediate vision correction region so that the optical power of said intermediate vision correction region abruptly changes from one of said two optical power values defined by said first and second transition points, to the other of said two optical power values.

9. A multifocal ocular lens according to claim 1, wherein a radially outer periphery of said central vision correction region and a radially innermost one of at least one first transition point cooperate to define a radially innermost varying-power radial zone in said intermediate vision correction region, and a radially inner periphery of said outer vision correction region and a radially outermost one of at least one second transition point cooperate to define a radially outermost varying-power radial zone in said intermediate vision correction region, while radially adjacent ones of said at least one first transition point and said at least one second transition point cooperate with each other to define at least one intermediate varying-power radial zone in said intermediate vision correction region, the distribution of optical power in each of said radially innermost and outermost varying-power radial zones being represented by a polynomial equation of the second or higher order, while the distribution of optical power in each of said at least one intermediate varying-power radial zone being represented by a polynomial equation of the third or higher order.

10. A multifocal ocular lens according to claim 1, wherein said at least one pair of first and second transition points defines at least one varying-power radial zone in said intermediate vision correction region, and the distribution in at least one of said at least one varying-power radial zone is represented by a polynomial equation of the fifth or higher order.

11. A multifocal ocular lens according to claim 1, wherein a radially outer periphery of said central vision correction region and a radially innermost one of at least one first transition point cooperate to define a radially innermost varying-power radial zone in said intermediate vision correction region, and a radially inner periphery of said outer vision correction region and a radially outermost one of at least one second transition point cooperate to define a radially outermost varying-power radial zone in said intermediate vision correction region, while radially adjacent ones of said at least one first transition point and said at least one second transition point cooperate with each other to define at least one intermediate varying-power radial zone in said intermediate vision correction region, the distribution of optical power in each of said radially innermost and outermost varying-power radial zones and said at least one intermediate varying-power radial zone being represented by a polynomial equation of the first order.

12. A multifocal ocular lens according to claim 1, wherein said intermediate vision correction region has a radial dimension of 0.5–3.5 mm.

13. A multifocal ocular lens according to claim 1, wherein said at least one pair of a first transition point and a second transition point consists of a plurality of pairs of first and second transition points, said first and second transition points of said plurality of pairs being alternately located in a radial direction of said intermediate vision correction region.

14. A multifocal ocular lens according to claim 1, wherein said outer vision correction region is used as a distant vision correction region having an optical power value Pd (Dptr.) while said central vision correction region is used as a near vision correction region having an optical power value which is equal to Pd (Dptr.)+ADD (Dptr.), and said optical power value Pb (Dptr.) defined by said first transition point and said optical power value Pc (Dptr.) defined by said second transition point are determined so as to satisfy the following formulas:

$$Pd+0.25 \leq Pb < Pd+ADD/2$$

$$Pd+ADD/2 \leq Pc \leq Pd+ADD.$$

15. A multifocal ocular lens according to claim 1, wherein said outer vision correction region is used as a distant vision correction region having an optical power value Pd (Dptr.) while said central vision correction region is used as a near vision correction region having an optical power value which is equal to Pd (Dptr.)+ADD (Dptr.), and said optical power value Pb (Dptr.) defined by said first transition point and said optical power value Pc (Dptr.) defined by said second transition point are determined so as to satisfy the following formulas:

$$Pd \leq Pb < Pd+ADD/2$$

$$Pd+ADD/2 \leq Pc \leq Pd+ADD-0.25.$$

16. A multifocal ocular lens according to claim 1, wherein said at least one pair of first and second transition points in said intermediate vision correction region consists of one pair of first and second transition points, said first transition point cooperating with a radially outer periphery of said central vision correction region to define a first varying-power radial zone in which the optical power continuously varies from said first optical power value of said central vision correction region to the optical power value defined by said first transition point, said first and second transition points cooperating to define a second varying-power radial zone in which the optical power continuously varies from the optical power value defined by said first transition point to the optical power value defined by said second transition point, said second transition point cooperating with a radially inner periphery of said outer vision correction region to define a third varying-power radial zone in which the optical power continuously varies from the optical power defined by said second transition point to said second optical power value of said outer vision correction region.

17. A multifocal ocular lens according to claim 16, wherein the optical power values y1, y2 and y3 in said first, second and third varying-power radial zones are represented by the following equations, respectively:

$$y1=E1(x^3/3-x^2(Wa+Wb)/2+x \cdot Wa \cdot Wb)+F1$$

$$y2=E2(x^3/3-x^2(Wb+Wc)/2+x \cdot Wb \cdot Wc)+F2$$

$$y3=E3(x^3/3-x^2(Wc+Wd)/2+x \cdot Wc \cdot Wd)+F3$$

wherein, x: a distance from an optical center axis of said central vision correction region;

Wa: a radial distance from said optical center axis to a boundary between said central and intermediate vision correction regions;

Wb: a radial distance from said optical center axis to said first transition point;

Wc: a radial distance from said optical center axis to said second transition point; and Wd: a radial distance from said optical center axis to a boundary between said intermediate and outer vision correction regions, and wherein $$E1=(Pa-Pb)/((Wa^3-Wb^3)/3-(Wa^2-Wb^2)(Wa+Wb)/2+(Wa-Wb)Wa \cdot Wb)$$

$$F1=Pa-E1(Wa^3/3-Wa^2(Wa+Wb)/2+Wa \cdot Wa \cdot Wb)$$

$$E2=(Pb-Pc)/((Wb^3-Wc^3)/3-(Wb^2-Wc^2)(Wb+Wc)/2+(Wb-Wc)Wb \cdot Wc)$$

$$F2=Pb-E2(Wb^3/3-Wb^2(Wb+Wc)/2+Wb \cdot Wb \cdot Wc)$$

$$E3=(Pc-Pd)/((Wc^3-Wd^3)/3-(Wc^2-Wd^2)(Wc+Wd)/2+(Wc-Wd)Wc \cdot Wd)$$

$$F3=Pc-E3(Wc^3/3-Wc^2(Wc+Wd)/2+Wc \cdot Wc \cdot Wd)$$

Pa: said first optical power value of said central vision correction region;

Pb: the optical power value defined by said first transition point;

Pc: the optical power value defined by said second transition point; and

Pd: said second optical power value of said outer vision correction region.

18. A multifocal ocular lens according to claim 17, wherein said optical power value y1 in said first varying-power radial zone is represented by the following equation in place of said equation $$y1=E1(x^3/3-x^2(Wa+Wb)/2+x \cdot Wa \cdot Wb)+F1:$$

$$y=(Pa-Pb)(x-Wb)^4/(Wa-Wb)^4+Pb.$$

19. A multifocal ocular lens according to claim 1, wherein an optical center axis of said central vision correction region is radially offset from a geometric center axis of the ocular lens by a radial distance of not larger than 2.0 mm.

20. A multifocal ocular lens according to claim 1, wherein said first and second optical power values of said central and outer vision correction regions are given by at least one of opposite surfaces of the ocular lens which is a spherical surface.

21. A multifocal ocular lens according to claim 1, wherein one of opposite surfaces of the ocular lens has a toric surface portion corresponding to said vision correction area.

22. A multifocal ocular lens according to claim 1, wherein said central vision correction region is used as a distant vision correction region having said first optical power value Pa (Dptr.), while said outer vision correction region is used as a near vision correction region having said second optical power value Pd (Dptr.), and said optical power value Pb (Dptr.) defined by said first transition point and said optical power value Pc (Dptr.) defined by said second transition point are determined so as to satisfy the following formulas:

$$Pa+(Pd-Pa)2/3 \leq Pb \leq Pd$$

$$Pa+0.25 \leq Pc \leq Pa+(Pd-Pa)/3.$$

23. A multifocal ocular lens according to claim 22, wherein said central, intermediate and outer vision correction regions are optically concentric with each other.

24. A multifocal ocular lens according to claim 22, wherein said first and second optical power values of said central and outer vision correction regions are substantially constant over an entire radial dimension thereof.

25. A multifocal ocular lens according to claim 22, wherein at least one of said two optical power values at said first and second transition points is given by an extreme value.

26. A multifocal ocular lens according to claim 22, wherein said at least one of said first and second transition points defines a constant optical power value in a constant-power radial zone of said intermediate vision correction region.

27. A multifocal ocular lens according to claim 22, a radially outer periphery of said central vision correction region and a radially innermost one of at least one first transition point cooperate to define a radially innermost varying-power radial zone in said intermediate vision correction region, and a radially inner periphery of said outer vision correction region and a radially outermost one of at least one second transition point cooperate to define a radially outermost varying-power radial zone in said intermediate vision correction region, while radially adjacent ones of said at least one first transition point and said at least one second transition point cooperate with each other to define at least one intermediate varying-power radial zone in said intermediate vision correction region, the distribution of optical power in each of said radially innermost and outermost varying-power radial zones being represented by a polynomial equation of the second or higher order, while the distribution of optical power in each of said at least one intermediate varying-power radial zone being represented by a polynomial equation of the third or higher order.

28. A multifocal ocular lens according to claim 22, wherein said at least one pair of first and second transition points in said intermediate vision correction region consists of one pair of first and second transition points, and wherein a distance Wa from an optical center axis of said central vision correction region to a boundary between said central and intermediate vision correction regions, a distance Wb from said optical center axis to said first transition point, a distance Wc from said optical center axis to said second transition point, and a distance Wd from said optical center axis to a boundary between said intermediate and outer vision correction regions are determined so as to satisfy the following equations:

$$0.1 \text{ mm} \leq Wa \leq 3.0 \text{ mm}$$

$$0.1 \text{ mm} \leq Wb-Wa \leq 3.0 \text{ mm}$$

$$0.1 \text{ mm} \leq Wc-Wb \leq 3.0 \text{ mm}$$

$$0.1 \text{ mm} \leq Wd-Wc \leq 3.0 \text{ mm}.$$

29. A multifocal ocular lens according to claim 22, wherein said at least one pair of first and second transition points in said intermediate vision correction region consists of one pair of first and second transition points, said first transition point cooperating with a radially outer periphery of said central vision correction region to define a first varying-power radial zone, said first and second transition points cooperating to define a second varying-power radial zone, said second transition point cooperating with a radially inner periphery of said outer vision correction region to define a third varying-power radial zone, the optical power values y1, y2 and y3 in said first, second and third varying-power radial zones being represented by the following equations, respectively:

$$y1 = E1(x^3/3 - x^2(Wa+Wb)/2 + x \cdot Wa \cdot Wb) + F1$$

$$y2 = E2(x^3/3 - x^2(Wb+Wc)/2 + x \cdot Wb \cdot Wc) + F2$$

$$y3 = E3(x^3/3 - x^2(Wc+Wd)/2 + x \cdot Wc \cdot Wd) + F3$$

wherein,
- x: a distance from an optical center axis of said central vision correction region;
- Wa: a radial distance from said optical center axis to a boundary between said central and intermediate vision correction regions;
- Wb: a radial distance from said optical center axis to said first transition point;
- Wc: a radial distance from said optical center axis to said second transition point; and
- Wd: a radial distance from said optical center axis to a boundary between said intermediate and outer vision correction regions, and wherein $$E1 = (Pa-Pb)/((Wa^3-Wb^3)/3 - (Wa^2-Wb^2)(Wa+Wb)/2 + (Wa-Wb)Wa \cdot Wb)$$

$$F1 = Pa - E1(Wa^3/3 - Wa^2(Wa+Wb)/2 + Wa \cdot Wa \cdot Wb)$$

$$E2 = (Pb-Pc)/((Wb^3-Wc^3)/3 - (Wb^2-Wc^2)(Wb+Wc)/2 + (Wb-Wc)Wb \cdot Wc)$$

$$F2 = Pb - E2(Wb^3/3 - Wb^2(Wb+Wc)/2 + Wb \cdot Wb \cdot Wc)$$

$$E3 = (Pc-Pd)/((Wc^3-Wd^3)/3 - (Wc^2-Wd^2)(Wc+Wd)/2 + (Wc-Wd)Wc \cdot Wd)$$

$$F3 = Pc - E3(Wc^3/3 - Wc^2(Wc+Wd)/2 + Wc \cdot Wc \cdot Wd)$$

- Pa: said first optical power value of said central vision correction region;
- Pb: the optical power value defined by said first transition point;
- Pc: the optical power value defined by said second transition point; and
- Pd: said second optical power value of said outer vision correction region.

30. A multifocal ocular lens according to claim 22, wherein said at least one pair of a first transition point and a second transition point consists of a plurality of pairs of first and second transition points, said first and second transition points of said plurality of pairs being alternately located in a radial direction of said intermediate vision correction region.

31. A multifocal ocular lens according to claim 22, wherein said at least one pair of first and second transition points defines at least one varying-power radial zone in said intermediate vision correction region, and the distribution in at least one of said at least one varying-power radial zone is represented by a polynomial equation of the fifth or higher order.

32. A multifocal ocular lens according to claim 22, wherein an optical center axis of said central vision correction region is radially offset from a geometric center axis of the ocular lens by a radial distance of not larger than 2.0 mm.

33. A multifocal ocular lens according to claim 22, wherein said first and second optical power values of said central and outer vision correction regions are given by at least one of opposite surfaces of the ocular lens which is a toric surface.

* * * * *